United States Patent
Nagase et al.

(10) Patent No.: US 12,469,314 B2
(45) Date of Patent: Nov. 11, 2025

(54) INFORMATION PROCESSING DEVICE, INFORMATION PROCESSING METHOD, AND PROGRAM

(71) Applicant: FUJIFILM Corporation, Tokyo (JP)

(72) Inventors: Masaya Nagase, Kanagawa (JP); Tsutomu Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 459 days.

(21) Appl. No.: 18/146,071

(22) Filed: Dec. 23, 2022

(65) Prior Publication Data

US 2023/0127415 A1 Apr. 27, 2023

Related U.S. Application Data

(63) Continuation of application No. PCT/JP2021/021997, filed on Jun. 9, 2021.

(30) Foreign Application Priority Data

Jul. 2, 2020 (JP) .................. 2020-115066

(51) Int. Cl.
*G06V 20/69* (2022.01)
*G06V 10/774* (2022.01)

(52) U.S. Cl.
CPC .......... *G06V 20/698* (2022.01); *G06V 10/774* (2022.01); *G06V 20/693* (2022.01)

(58) Field of Classification Search
CPC ... G06V 20/698; G06V 20/693; G06V 10/774
See application file for complete search history.

(56) References Cited

U.S. PATENT DOCUMENTS

| | | |
|---|---|---|
| 2005/0163359 A1 | 7/2005 | Murao et al. |
| 2015/0138334 A1 | 5/2015 | Usuba et al. |
| 2016/0245813 A1 | 8/2016 | Mir et al. |
| 2017/0081628 A1 | 3/2017 | Matsubara |
| 2018/0106713 A1 | 4/2018 | Koehn et al. |

(Continued)

FOREIGN PATENT DOCUMENTS

| | | |
|---|---|---|
| EP | 2 889 367 A1 | 7/2015 |
| JP | 2014-41084 A | 3/2014 |

(Continued)

OTHER PUBLICATIONS

Japanese Office Action for corresponding Japanese Application No. 2022-533791, dated Nov. 21, 2023, with English translation.

(Continued)

*Primary Examiner* — Pinalben Patel
(74) *Attorney, Agent, or Firm* — Birch, Stewart, Kolasch & Birch, LLP

(57) ABSTRACT

An information processing device detects a cell candidate region for determining a unity of a cell from a vessel image obtained by imaging a vessel in which the cell is seeded and includes at least one processor. The processor performs an acquisition process of acquiring the vessel image, performs a detection process of detecting a cell region including the cell and a cell-like region including an object similar to the cell as the cell candidate regions from the acquired vessel image, and an output process of outputting information indicating the detected cell candidate regions.

12 Claims, 16 Drawing Sheets

(56) References Cited

U.S. PATENT DOCUMENTS

| | | |
|---|---|---|
| 2019/0347467 A1 | 11/2019 | Ohsaka et al. |
| 2020/0184637 A1 | 6/2020 | El-Zehiry et al. |
| 2020/0225236 A1 | 7/2020 | Mir et al. |
| 2020/0257886 A1 | 8/2020 | Fujimoto et al. |
| 2020/0388033 A1* | 12/2020 | Matlock ............... G06V 10/774 |
| 2021/0133965 A1* | 5/2021 | Kazayama ............. G06V 20/69 |
| 2021/0382056 A1 | 12/2021 | Mir et al. |

FOREIGN PATENT DOCUMENTS

| | | | | |
|---|---|---|---|---|
| JP | 2014041084 A | * | 3/2014 | ........... G02B 21/365 |
| JP | 2015-91220 A | | 5/2015 | |
| JP | 2015091220 A | * | 5/2015 | |
| JP | 2019-195304 A | | 11/2019 | |
| JP | 2019201666 A | * | 11/2019 | ............ B01L 3/5085 |
| WO | WO 2004/042392 A1 | | 5/2004 | |
| WO | WO 2017/082048 A1 | | 5/2017 | |

OTHER PUBLICATIONS

International Preliminary Report on Patentability and Written Opinion of the International Searching Authority for International Application No. PCT/JP2021/021997, dated Jan. 12, 2023, with an English translation.
International Search Report for International Application No. PCT/JP2021/021997, dated Aug. 24, 2021, with an English translation.
"CloneSelect Imager Operator Manual Software Release 1.3.73.1073," Molecular Devices, XP093102936, Jun. 1, 2011, pp. 1-69.
Extended European Search Report for corresponding European Application No. 21833691.5, dated Mar. 31, 2025.

* cited by examiner

INFORMATION PROCESSING DEVICE, INFORMATION PROCESSING METHOD, AND PROGRAM

CROSS-REFERENCE TO RELATED APPLICATION

This application is a continuation application of International Application No. PCT/JP2021/021997, filed Jun. 9, 2021, the disclosure of which is incorporated herein by reference in its entirety. Further, this application claims priority from Japanese Patent Application No. 2020-115066 filed on Jul. 2, 2020, the disclosure of which is incorporated herein by reference in its entirety.

BACKGROUND

1. Technical Field

The technique of the present disclosure relates to an information processing device, an information processing method, and a program.

2. Description of the Related Art

In recent years, antibody drugs have attracted attention. Unlike low-molecular drugs according to the related art, antibody drugs are composed of, for example, complex proteins. Therefore, it is difficult to artificially synthesize the antibody drugs. Therefore, the antibody drugs are produced by inserting a gene corresponding to a desired protein into a cell, such as a Chinese hamster ovary (CHO) cell, producing the desired protein by a function of the cell, and then extracting and purifying the protein.

In addition, a single cell cloning technique is known in which cells having genes inserted thereinto are seeded and cultured one by one in each well (culture vessel) of a well plate to generate cell populations derived from single cells. According to the single cell cloning technique, the uniformity of the cell producing an antibody is improved, and the quality of antibody drugs produced by this technique is improved.

However, in a case in which cells are seeded in the well, a plurality of cells may be erroneously seeded. In this case, the cell population (colony) cultured in the well is derived from a plurality of cells, and the unity of the cells (so-called monoclonality) is not obtained. For the cell population cultured in the well, it is necessary to check that, immediately after the cells are seeded in the well, the cells are single cells in order to guarantee the unity of the cells.

The seeding of single cells is performed by dispensing a liquid including the cells having genes inserted thereinto and a culture medium into the well. JP2019-201666A discloses a technique that dispenses cells into a plurality of wells and then determines the number of cells present in each well using cell labels.

SUMMARY

However, in the technique disclosed in JP2019-201666A, it is difficult to guarantee the unity of the cells at the time of seeding. Therefore, in actual fact, the determination of the unity of the cells by an image is performed in parallel.

In the well in which the cells are seeded, non-cells including dust are likely to be present in addition to true cells. Some non-cells have a shape similar to that of cells. Therefore, it is considered to increase detection accuracy to detect only the true cells, in order to detect the cells using image processing. Meanwhile, in a case in which the detection accuracy is increased, there is a concern that the cell will be determined to be a non-cell and sensitivity will be reduced. As described above, in a case in which the detection accuracy of the cell is high, even though a plurality of cells are seeded in the well, some of the plurality of seeded cells may be determined to be non-cells. As a result, the accuracy of guaranteeing the unity of the cells is reduced.

The technique of the present disclosure provides an information processing device, an information processing method, and a program that can increase the accuracy of guaranteeing the unity of cells, that is, that firstly enable cell detection with high sensitivity and secondly enable cell detection which achieves both sensitivity and accuracy as much as possible.

In order to achieve the above object, according to the present disclosure, there is provided an information processing device that detects a cell candidate region for determining a unity of a cell from a vessel image obtained by imaging a vessel in which the cell is seeded. The information processing device comprises at least one processor. The processor performs an acquisition process of acquiring the vessel image, performs a detection process of detecting a cell region including the cell and a cell-like region including an object similar to the cell as the cell candidate regions from the acquired vessel image, and performs an output process of outputting information indicating the detected cell candidate regions.

Preferably, the processor detects the cell candidate regions using a trained model for detection which has been created by training a learning model using training data in the detection process.

Preferably, the training data is a data set including a plurality of cell sample images given a label indicating the cell and a plurality of non-cell sample images given a label indicating a non-cell, and the processor performs a classification process of classifying the non-cell sample image similar to the cell sample image among the non-cell sample images as a cell-like sample image and performs a learning process of creating the trained model for detection that detects the cell sample image and the cell-like sample image as the cell candidate regions.

Preferably, the non-cell sample image is given a sub-label, and the processor classifies the non-cell sample image having similar appearance features to the cell as the cell-like sample image on the basis of the sub-label in the classification process.

Preferably, in the classification process, the processor maps the cell sample image and the non-cell sample image to a feature amount space on the basis of a feature amount and classifies the non-cell sample image similar to the cell sample image among the non-cell sample images in the feature amount space as the cell-like sample image.

Preferably, in the classification process, the processor classifies the non-cell sample image misclassified as the cell candidate region as the cell-like sample image, using a trained model for classification that classifies only the cell sample image out of the cell sample image and the non-cell sample image as the cell candidate region.

Preferably, after performing the classification process, the processor performs the learning process for creating the trained model for detection and performs a replacement process of replacing the learning model, which is being trained, with the trained model for classification.

Preferably, the processor repeats the classification process, the learning process, and the replacement process on a plurality of the non-cell sample images a predetermined number of times or until there is no non-cell sample image misclassified as the cell candidate region.

Preferably, the processor trains the learning model using deep learning in the learning process.

Preferably, the processor performs a display process of displaying the cell candidate region on a display separately from the vessel image in the output process.

Preferably, the processor displays a probability that the cell candidate region displayed on the display will be the cell in the display process.

Preferably, the processor performs a receiving process of receiving an operation of a user giving a determination result of whether or not the cell candidate region displayed on the display is the cell.

Preferably, the processor performs a giving process of giving the determination result received by the receiving process to the cell candidate region.

Preferably, in a case in which there are a plurality of the vessel images acquired by the acquisition process, the processor aggregates the detection result of the cell candidate region by the detection process or the determination result given by the giving process for each of the vessel images and outputs an aggregation result.

Preferably, the aggregation result includes the unity of the cell or the number of cells for each vessel image.

According to the present disclosure, there is provided an information processing method that performs a process of detecting a cell candidate region for determining a unity of a cell from a vessel image obtained by imaging a vessel in which the cell is seeded. The information processing method comprises: an acquisition process of acquiring the vessel image; a detection process of detecting a cell region including the cell and a cell-like region including an object similar to the cell as the cell candidate regions from the acquired vessel image; and an output process of outputting information indicating the detected cell candidate regions.

There is provided a program that causes a computer to execute a process of detecting a cell candidate region for determining a unity of a cell from a vessel image obtained by imaging a vessel in which the cell is seeded. The program causes the computer to execute: an acquisition process of acquiring the vessel image; a detection process of detecting a cell region including the cell and a cell-like region including an object similar to the cell as the cell candidate regions from the acquired vessel image; and an output process of outputting information indicating the detected cell candidate regions.

According to the technique of the present disclosure, it is possible to provide an information processing device, an information processing method, and a program that can increase the accuracy of guaranteeing the unity of cells, that is, that firstly enable cell detection with high sensitivity and secondly enable cell detection which achieves both sensitivity and accuracy as much as possible.

BRIEF DESCRIPTION OF THE DRAWINGS

Exemplary embodiments according to the technique of the present disclosure will be described in detail based on the following figures, wherein.

DETAILED DESCRIPTION

Figure 1:
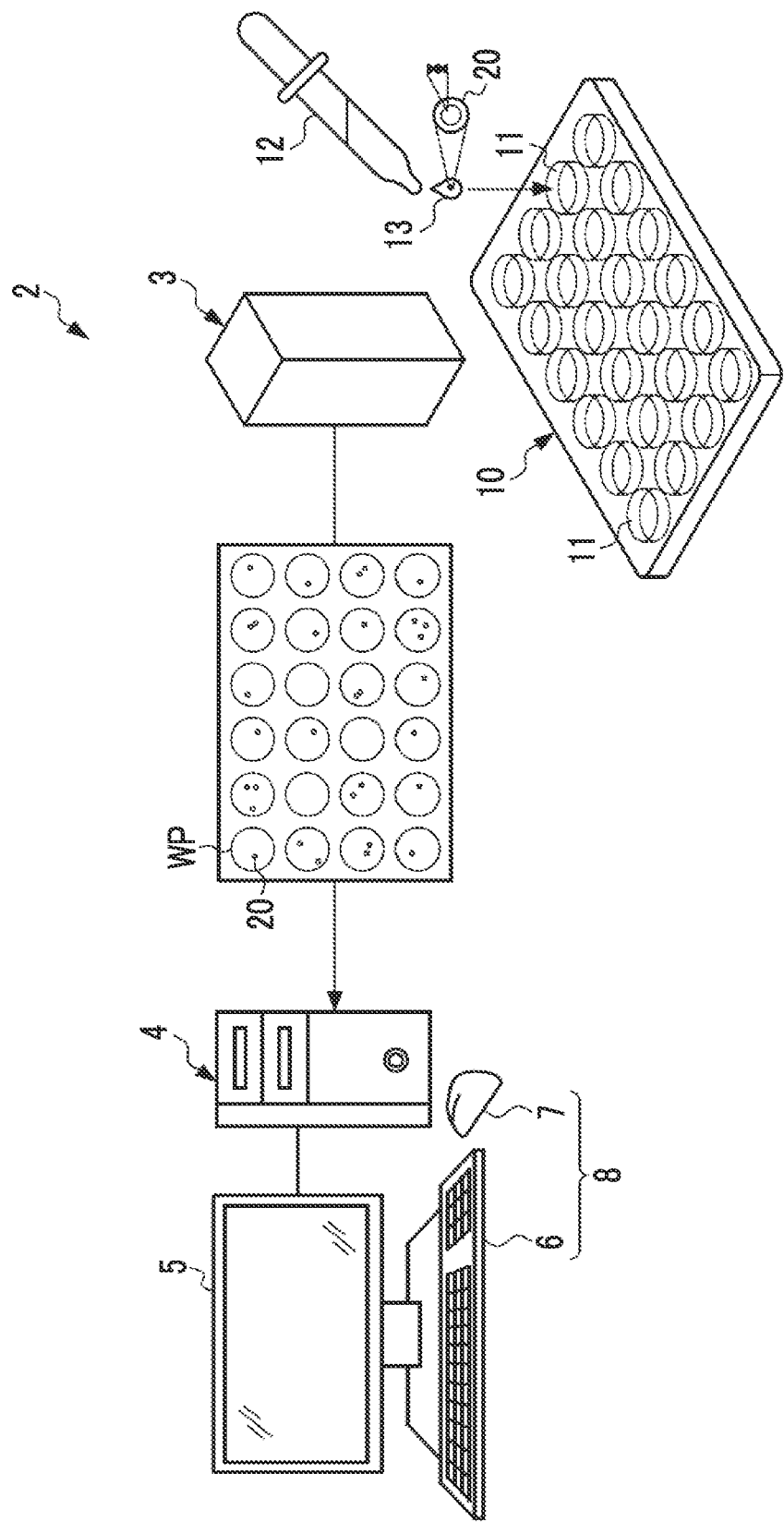
FIG. 1 is a schematic diagram illustrating a determination support system.

FIG. 1 schematically illustrates a determination support system 2. The determination support system 2 is a system that supports determination of whether or not only one cell is seeded in a well as a culture vessel, that is, determination of the unity of the cell at a time when the cell is seeded in the well. The final determination of the unity of the cell is made by the user on the basis of an image of the well at the time when the cell is seeded. The determination support system 2 presents a cell candidate region, which is a region to be determined by the user, in the image of the well to support the determination of the unity of the cell.

The determination support system 2 includes an imaging device 3 and an information processing device 4. The information processing device 4 is composed of a computer. For example, a display 5, a keyboard 6, and a mouse 7 are connected to the information processing device 4. The keyboard 6 and the mouse 7 constitute an input operation unit 8 for the user to input information. The input operation unit 8 also includes, for example, a touch panel.

The imaging device 3 is, for example, a phase contrast microscope and optically images a well plate 10, in which cells are seeded and cultured, as an object to be imaged. In FIG. 1, for example, a light source for illuminating the object to be imaged is not illustrated. A plurality of wells 11 are formed in the well plate 10. As the well plate 10, for example, a "96-well plate" in which 96 wells 11 are formed is used. Each well 11 is a culture vessel in which one cell is seeded. In this embodiment, for the sake of simplicity of illustration, a "24-well plate" in which 24 wells 11 are formed is illustrated as the well plate 10.

The cells are seeded by dispensing a droplet 13 into each well 11 from a reservoir containing a culture medium solution including the cells using, for example, a pipette 12. A cell 20 is included in the droplet 13. The cell 20 is, for example, a CHO cell that produces an antibody. For example, a gene corresponding to a desired human protein is inserted into the cell 20.

The imaging device 3 images each well 11 of the well plate 10 as the object to be imaged. The imaging device 3 performs imaging immediately after the droplet 13 is dispensed into each well 11. Each of the images (hereinafter, referred to as vessel images) WP of the wells 11 captured by the imaging device 3 is transmitted to the information processing device 4. The seeded cell 20 is included in the vessel image WP. The information processing device 4 detects a cell region including the cell 20 and a cell-like region including an object similar to the cell 20 as the cell candidate regions from the vessel image WP, which will be described in detail below.

Figure 2:
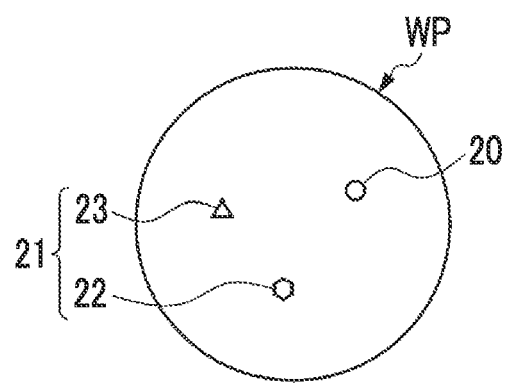
FIG. 2 is a schematic diagram illustrating an example of a vessel image.

FIG. 2 schematically illustrates an example of the vessel image WP. As illustrated in FIG. 2, in addition to the cell 20, non-cellular structures 21 that are not the cell are likely to be included in the vessel image WP. The non-cellular structures 21 include, for example, dust, debris, shadows of cells or non-cellular structures, and scratches on the well. In addition, the non-cellular structures 21 are divided into a cell-like structure 22 which is a structure similar to the cell and a cell-unlike structure 23 which is a structure dissimilar to the cell on the basis of a shape in appearance.

The cell 20 is defined as a "circular structure" by, for example, focusing on a shape and simply expressing the shape of the cell in a simplified manner. The cell-like structure 22 is a structure that has an outward shape (that is, a shape close to a circular shape) close to that of the cell 20 and is likely to be a cell. The cell-unlike structure 23 is a structure that has an outward shape significantly different from that of the cell 20 and is unlikely to be a cell. Here, the term "being likely to be a cell" means "possibility is equal to or greater than a predetermined value". On the other hand, the term "being unlikely to be a cell" means that "possibility is less than the predetermined value". In addition, the cell 20 may be defined on the basis of features other than the shape.

The information processing device 4 detects the cell region including the cell 20 and the cell-like region including the cell-like structure 22 as the cell candidate regions on the basis of the vessel image WP. The information processing device 4 detects the cell-like structure 22 in addition to the region including the cell 20. Therefore, sensitivity, which is the percentage at which a region including a true cell is detected as the cell candidate region, is improved. The above-mentioned predetermined value corresponds to a sensitivity target set value (for example, 90%, 95%, 99%, or the like).

Figure 3:
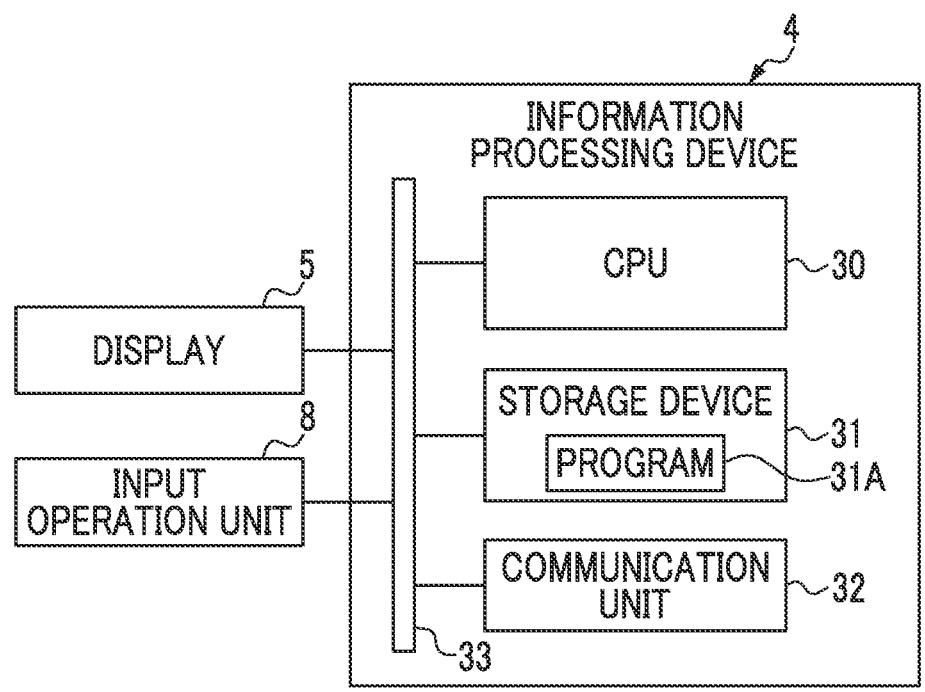
FIG. 3 is a block diagram illustrating a hardware configuration of an information processing device.

FIG. 3 illustrates a hardware configuration of the information processing device 4. As illustrated in FIG. 3, the information processing device 4 comprises a central processing unit (CPU) 30, a storage device 31, and a communication unit 32, which are connected to each other through a bus line 33. In addition, the display 5 and the input operation unit 8 are connected to the bus line 33.

The CPU 30 is an arithmetic device that reads a program 31A and various types of data (not illustrated) stored in the storage device 31 and performs a process to implement various functions. The CPU 30 is an example of a "processor" according to the technique of the present disclosure.

The storage device 31 includes, for example, a random access memory (RAM), a read only memory (ROM), a storage device, or the like. The RAM is, for example, a volatile memory used as a work area or the like. The ROM is, for example, a non-volatile memory, such as a flash memory, that stores a program 31A and various types of data. The storage device is, for example, a hard disk drive (HDD) or a solid state drive (SSD). The storage device stores, for example, an operating system (OS), application programs, image data, and various types of data.

The communication unit 32 is a network interface that controls the transmission of various types of information through a network such as a local area network (LAN) or a wide area network (WAN). The display 5 displays various screens. The information processing device 4 receives an input of an operation instruction from the input operation unit 8 through various screens.

Figure 4:
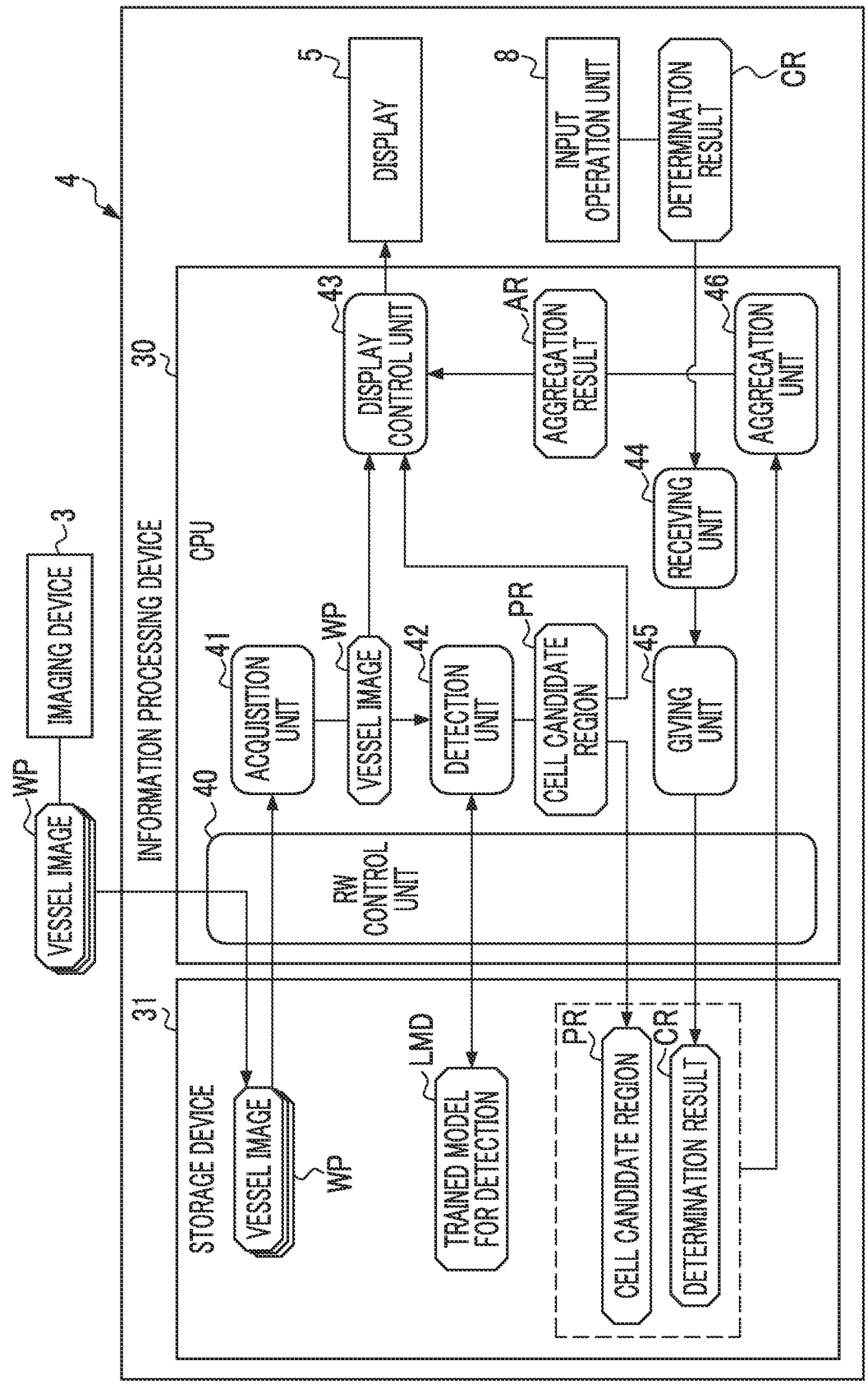
FIG. 4 is a block diagram illustrating a functional configuration of the information processing device in an operation phase.

FIG. 4 illustrates a functional configuration of the information processing device 4 in an operation phase. The CPU 30 performs a process on the basis of the program 31A to implement the functions of the information processing device 4. The information processing device 4 performs a process of detecting the cell candidate region using a trained model generated by machine learning. The functional configuration illustrated in FIG. 4 is a configuration implemented in the "operation phase" in which the trained model is operated.

In the operation phase, a read and write control unit (hereinafter, referred to as a RW control unit) 40, an acquisition unit 41, a detection unit 42, a display control unit 43, a receiving unit 44, a giving unit 45, and an aggregation unit 46 are configured in the CPU 30.

The RW control unit 40 controls the reading of various types of data from the storage device 31 and the writing of various types of data to the storage device 31. The RW control unit 40 writes the vessel image WP received from the imaging device 3 to the storage device 31.

The acquisition unit 41 performs an acquisition process of acquiring the vessel image WP from the storage device 31 through the RW control unit 40. The acquisition unit 41 inputs the acquired vessel image WP to the detection unit 42. In addition, the acquisition unit 41 inputs the acquired vessel image WP to the display control unit 43.

The detection unit 42 performs a process of detecting the cell candidate region using a trained model LMD for detection obtained by training a learning model M (see FIG. 12) with training data. The trained model LMD for detection is configured by, for example, a convolutional neural network trained by deep learning. The trained model LMD for detection is stored in the storage device 31. The detection unit 42 is a functional unit implemented by the execution of a process by the CPU 30 using the trained model LMD for detection.

Figure 5:
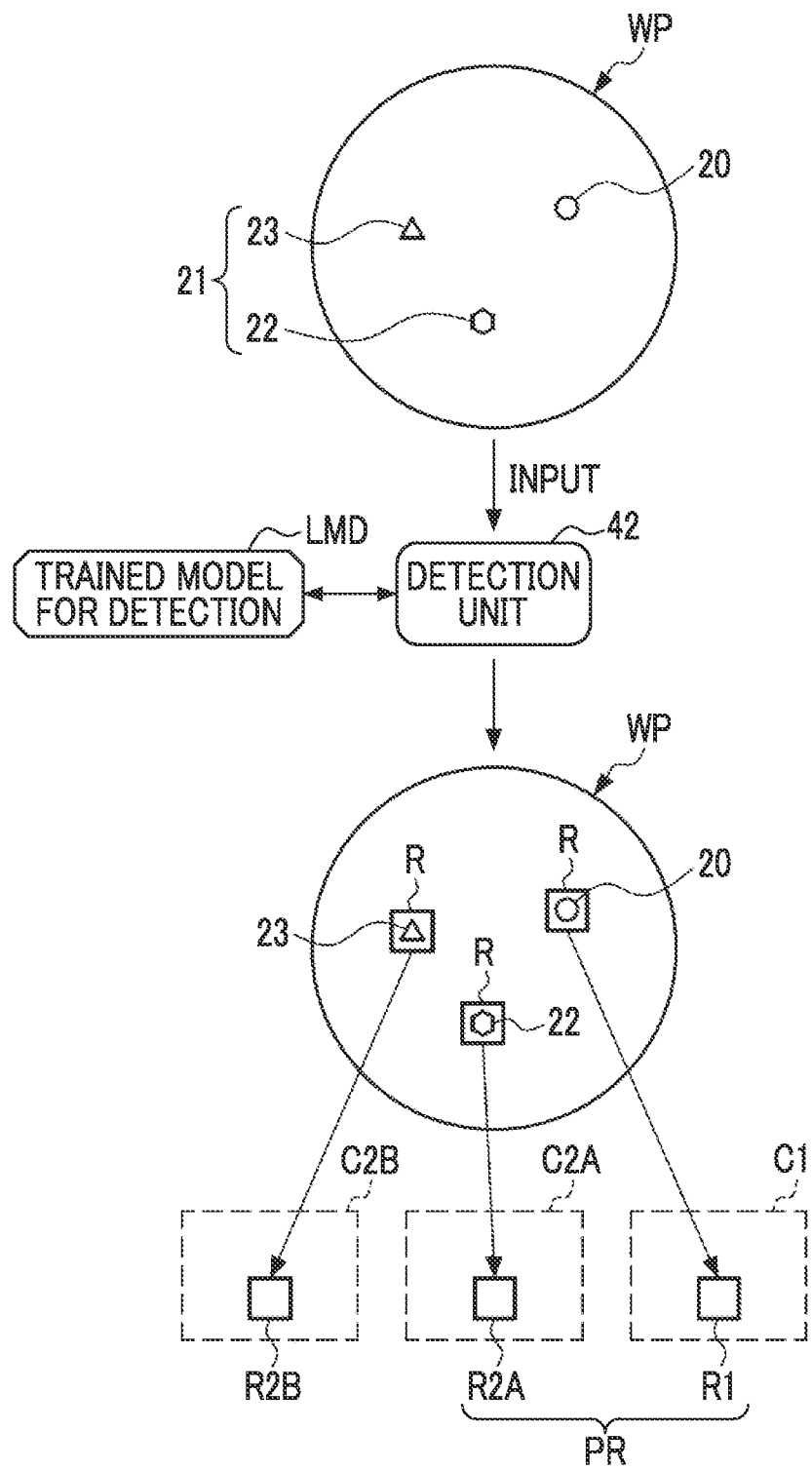
FIG. 5 is a diagram illustrating a detection process.

FIG. 5 illustrates the detection process by the detection unit 42. As illustrated in FIG. 5, the vessel image WP input from the acquisition unit 41 is input as an input image to the detection unit 42. The detection unit 42 performs object detection on the basis of the input vessel image WP, using the trained model LMD for detection, to detect an object region R including an object which is some kind of structure. Then, the detection unit 42 classifies each detected object region R into a plurality of classes on the basis of the feature amount of the structure in the object region R. In addition, the object region is also referred to as a bounding box.

For example, the detection unit 42 classifies the object region R into three classes of a cell class C1, a cell-like class C2A, and a cell-unlike class C2B. The cell class C1 is a class into which the object region R (hereinafter, referred to as a cell region R1) including the cell 20 is classified. The cell-like class C2A is a class into which the object region R (hereinafter, referred to as a cell-like region R2A) including the cell-like structure 22 is classified. The cell-unlike class C2B is a class into which the object region R (hereinafter, referred to as a cell-unlike region R2B) including the cell-unlike structure 23 is classified.

The detection unit 42 detects a region, which is classified as the cell region R1 or the cell-like region R2A, among the object regions R as a cell candidate region PR.

In addition, the detection unit 42 is not limited to the configuration in which it classifies the object regions R into three classes. For example, the detection unit 42 may classify the object regions R into two classes of a cell candidate class and a non-cell candidate class.

Returning to FIG. 4, the detection unit 42 supplies the detection result of the cell candidate region PR to the display control unit 43. In addition, the detection unit 42 writes the detection result of the cell candidate region PR to the storage device 31 through the RW control unit 40.

The display control unit 43 performs a display process of displaying the cell candidate region PR on the display 5 separately from the vessel image WP on the basis of the vessel image WP supplied from the acquisition unit 41 and the detection result of the cell candidate region PR supplied from the detection unit 42. Specifically, the display control unit 43 displays the vessel image WP on the display 5 and displays information indicating the cell candidate region PR in the vessel image WP. The display control unit 43 is an example of an output unit that performs an output process according to the technique of the present disclosure.

The receiving unit 44 performs a receiving process of receiving the operation of the user giving a determination result CR of whether or not the cell candidate region PR displayed on the display 5 is a cell. The user can determine whether or not the structure in the cell candidate region PR displayed on the display 5 is a cell and input the visual determination result CR of the user using the input operation unit 8. The receiving unit 44 receives the determination result CR input through the input operation unit 8 and supplies the received determination result CR to the giving unit 45.

The giving unit 45 performs a giving process of giving the determination result CR received by the receiving unit 44 to the cell candidate region PR. Specifically, in a case in which the determination result CR is supplied from the receiving unit 44, the giving unit 45 writes the determination result CR to the storage device 31 through the RW control unit 40. The determination result CR is stored in the storage device 31 in association with the corresponding cell candidate region PR. In addition, the determination result CR is given to each of a plurality of cell candidate regions PR detected for each vessel image WP and stored in the storage device 31.

Further, the determination results CR for the plurality of cell candidate regions PR stored in the storage device 31 may be used as training data for the learning model M which will be described below.

For example, the aggregation unit 46 starts an aggregation process on condition that the determination result CR is given to all of the plurality of cell candidate regions PR detected from one vessel image WP. The aggregation unit 46 performs the aggregation process of aggregating the detection result of the cell candidate region PR by the detection unit 42 or the determination result CR given by the giving unit 45 for each vessel image WP and outputting an aggregation result AR. In this embodiment, the aggregation unit 46 aggregates the determination results CR given to each of the cell candidate regions PR for each vessel image WP and outputs the aggregation result AR.

The aggregation result AR output by the aggregation unit 46 is supplied to the display control unit 43. The display control unit 43 displays the aggregation result AR (see FIG. 8) on the display 5. The user can easily visually determine whether or not a single cell is seeded in each well 11 on the basis of the aggregation result AR displayed on the display 5.

Figure 6:
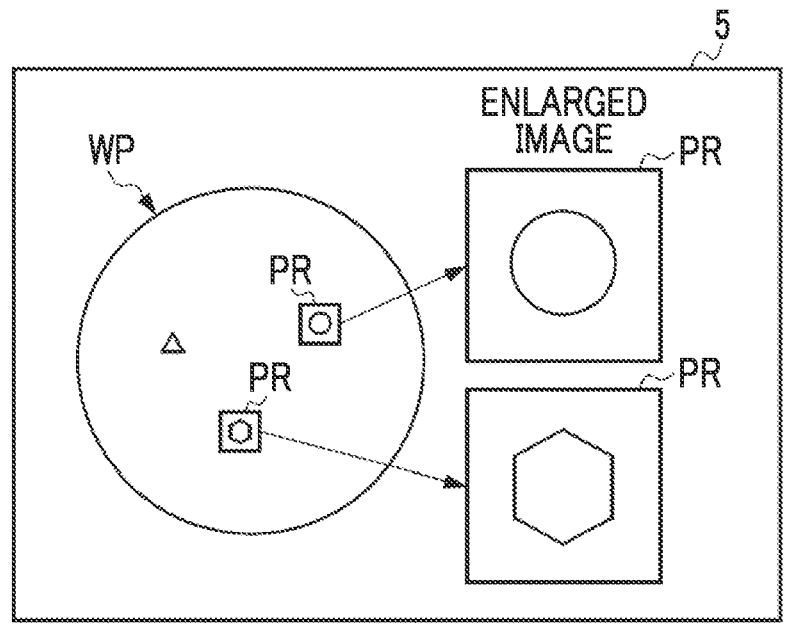
FIG. 6 is a diagram illustrating an example of the display of a cell candidate region.

FIG. 6 illustrates an example of the display of the cell candidate regions PR by the display control unit 43. As illustrated in FIG. 6, for example, the display control unit 43 displays the cell candidate regions PR in the vessel image WP and displays each of enlarged images of the cell candidate regions PR outside the vessel image WP. The user can observe the enlarged images to more accurately determine whether or not the cell candidate region is a cell. In addition, a plurality of enlarged images may be displayed to partially overlap each other. Further, the shape of the cell candidate region PR is not limited to a rectangular shape and may be other shapes including a circular shape. Furthermore, the display control unit 43 may display the cell candidate region PR to be highlighted by, for example, coloring.

Figure 7:
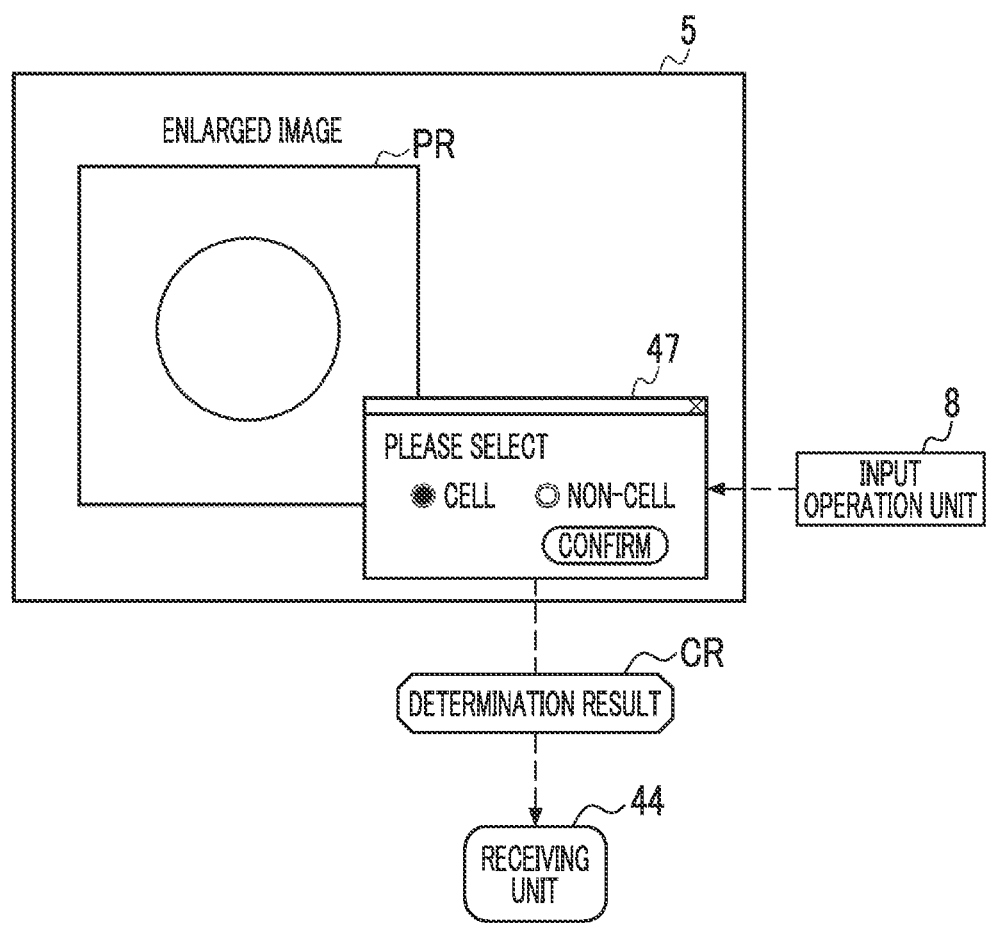
FIG. 7 is a diagram illustrating an example of an input interface for inputting a determination result.

FIG. 7 illustrates an example of an input interface for inputting the determination result CR of whether or not the cell candidate region is a cell. As illustrated in FIG. 7, for example, the display control unit 43 displays a selection box 47 as a graphical user interface (GUI) on the display 5 in addition to the enlarged image of the cell candidate region PR selected by the user. The user can select whether the cell candidate region is a cell or a non-cell and confirms the selection on the basis of the selection box 47, using the input operation unit 8. In a case in which the selection is confirmed using the input operation unit 8, the determination result CR of whether or not the cell candidate region is a cell is input to the receiving unit 44.

In addition, it is also preferable to reflect the determination result CR input through the input operation unit 8 in the display of the cell candidate region PR illustrated in FIG. 6. For example, the display control unit 43 displays the cell candidate region PR determined to be a cell by the user and the cell candidate region PR determined to be a non-cell by the user in different colors.

Further, it is also preferable to display the determination result CR and the cell candidate region PR stored in the storage device 31 on the display 5 in response to the operation of the input operation unit 8. This enables the user to check the determination result CR input in the past. In addition, in a case in which a plurality of users make a determination, it is possible to check the determination result CR input by another user.

Figure 8:
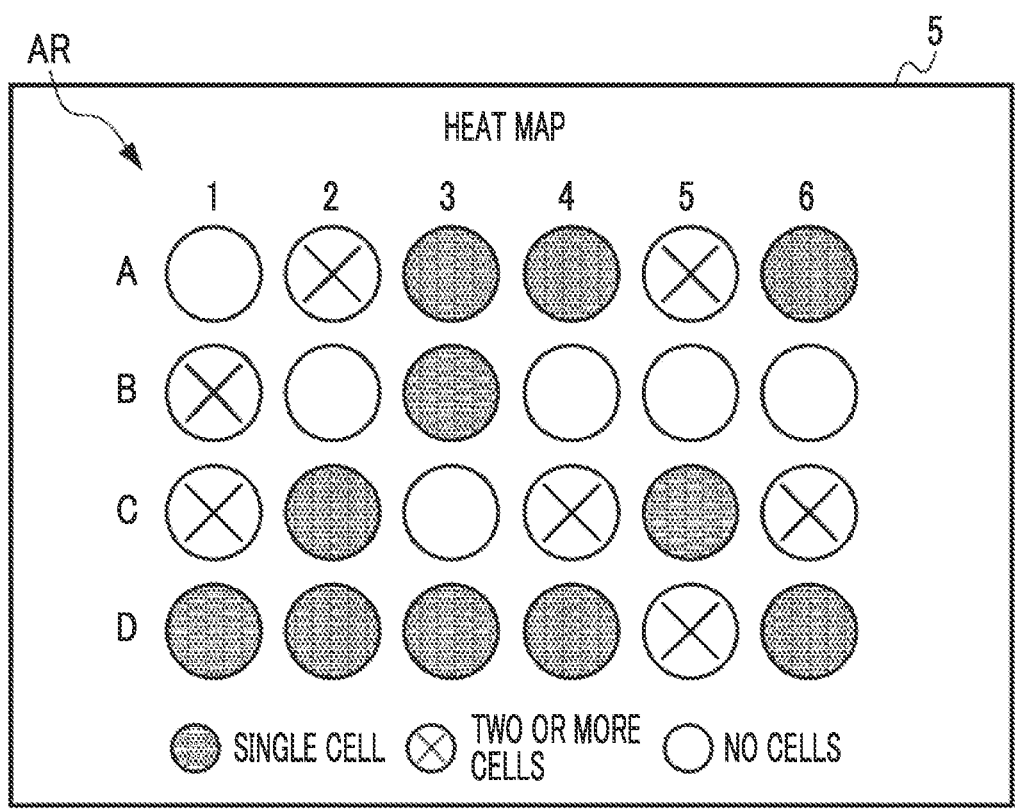
FIG. 8 is a diagram illustrating an example of the display of an aggregation result.

FIG. 8 illustrates an example of the display of the aggregation result AR by the display control unit 43. As illustrated in FIG. 8, whether each well 11 of the well plate 10 includes a "single cell", "two or more cells", or "no cells" on the basis of the aggregation result AR is displayed. The display aspect illustrated in FIG. 8 is a so-called heat map, and the user can visually understand the number of wells 11 in which a single cell is seeded and the position thereof. In addition, the aggregation result AR is not limited to the heat map and may be a table in which the unity of the cells or the number of cells is listed for each well 11.

Figure 9:
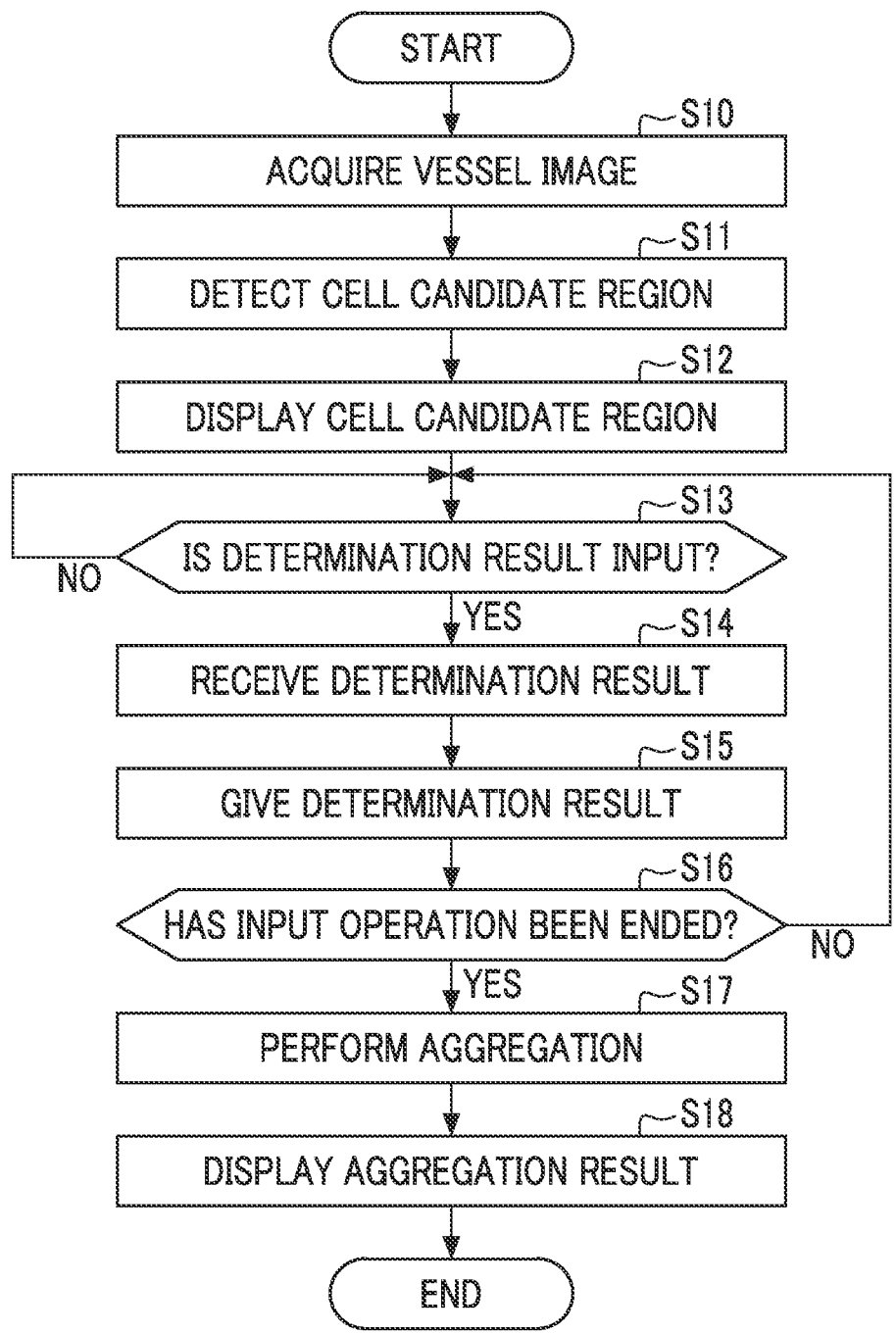
FIG. 9 is a flowchart illustrating a flow of a series of processes of the determination support system.

Next, a flow of a series of processes of the determination support system 2 will be described with reference to a flowchart illustrated in FIG. 9. First, the acquisition unit 41 acquires the vessel image WP which has been captured by the imaging device 3 and stored in the storage device 31 (Step S10). In Step S10, the acquisition unit 41 supplies the acquired vessel image WP to the detection unit 42 and the display control unit 43.

The detection unit 42 detects the cell region R1 and the cell-like region R2A (see FIG. 5) as the cell candidate regions PR from the vessel image WP input from the acquisition unit 41 (Step S11). In Step S11, the detection unit 42 supplies the detection results of the cell candidate regions PR to the display control unit 43 and writes the detection results to the storage device 31.

The display control unit 43 displays the cell candidate regions PR supplied from the detection unit 42 on the display 5, for example, as illustrated in FIG. 6 (Step S12). The user determines whether or not a structure in the cell candidate region PR displayed on the display 5 is a cell and inputs the determination result CR using the input operation unit 8, for example, as illustrated in FIG. 7 (Step S13).

In a case in which the determination result CR is input using the input operation unit 8 (Step S13: YES), the receiving unit 44 receives the determination result CR and supplies the received determination result CR to the giving unit 45 (Step S14). The giving unit 45 gives the determination result CR supplied from the receiving unit 44 to the cell candidate region PR (Step S15).

Then, it is determined whether or not an input operation has been ended by the input of the determination results CR for all of the plurality of cell candidate regions PR detected from one vessel image WP by the user (Step S16). In a case in which the input operation has not been ended (Step S16: NO), the process returns to Step S13. On the other hand, in a case in which the input operation has been ended (Step S16: YES), the aggregation unit 46 performs the aggregation process (Step S17). In Step S17, the aggregation unit 46 outputs the aggregation result AR and supplies the aggregation result AR to the display control unit 43.

For example, as illustrated in FIG. 8, the display control unit 43 displays the aggregation result AR on the display 5 (Step S17). In this way, a series of processes of the determination support system 2 ends.

In Step S16, the end condition of the input operation is that the user inputs the determination results CR for all of the plurality of cell candidate regions PR detected from one vessel image WP. Instead of this, at a time when two cell candidate regions PR are determined to be true cells (that is, it is determined that the cells are not single) for one vessel image WP, the input operation for the vessel image WP may be ended.

According to the determination support system 2 of this embodiment, in addition to the cell region R1 including the cell, the cell-like region R2A including an object similar to the cell is detected as the cell candidate region from the vessel image WP and is presented to the user. Therefore, the sensitivity, which is the percentage at which a region including the true cell is detected as the cell candidate region PR, is improved. This makes it possible to increase the accuracy of guaranteeing the unity of the cell. That is, firstly, it is possible to perform cell detection with high sensitivity.

Secondly, it is possible to perform cell detection that can achieve both high sensitivity and high accuracy as much as possible. Here, the accuracy is the ratio of the number of detections of the regions including true cells as the cell candidate regions PR to the number of detections of the cell candidate regions PR (the sum of the number of detections of the cell regions R1 including cells and the number of detections of the cell-like regions R2A including objects similar to the cells. It is possible to adjust the accuracy on the premise that the sensitivity is maintained as high as possible for a method that captures the feature amounts of cells and non-cells according to pure true classification as in the related art. Furthermore, in a case in which cells having features similar to those of a known non-cell sample appear in an unknown sample, the sensitivity can be maintained by each embodiment which will be described below.

Figure 10:
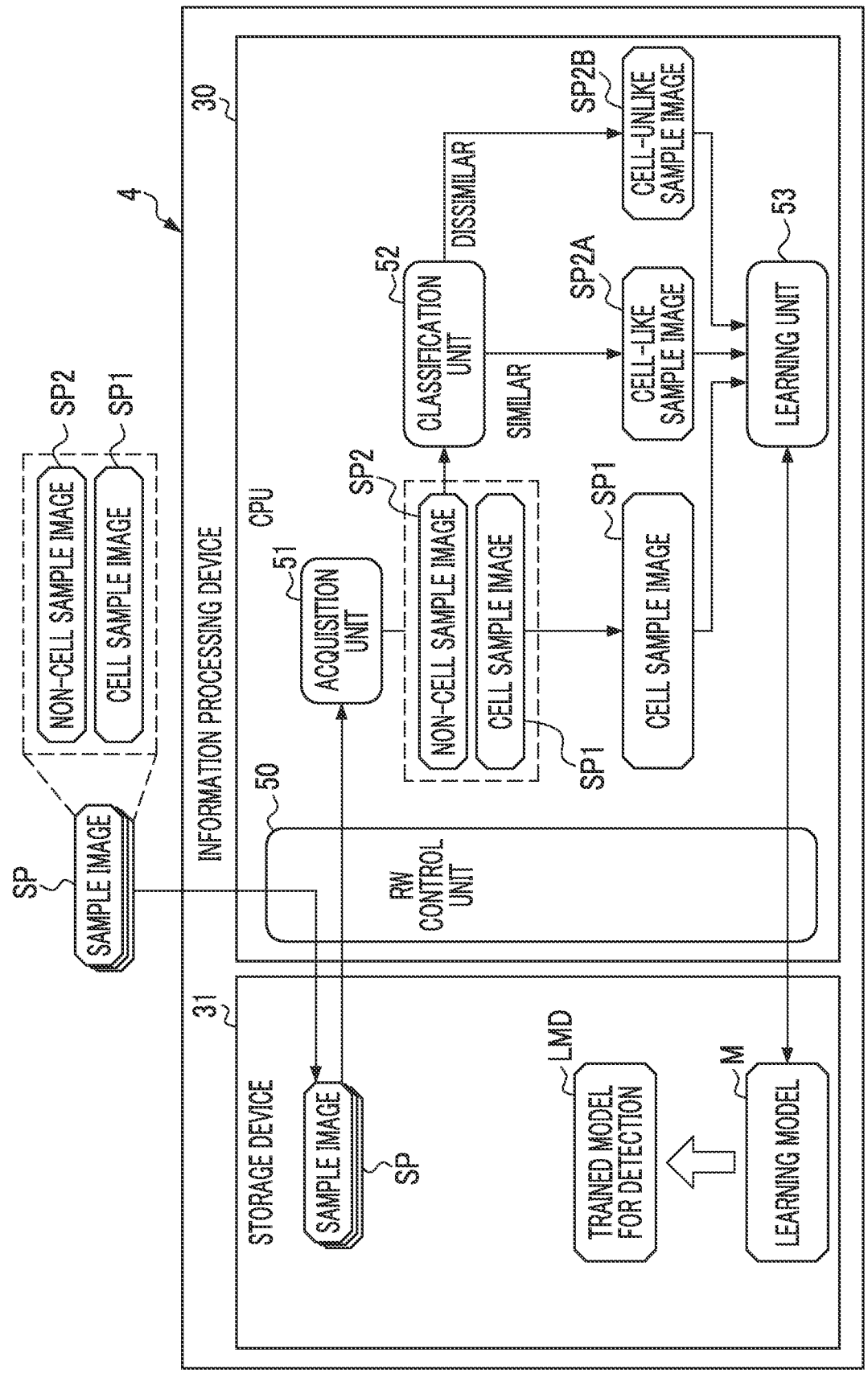
FIG. 10 is a block diagram illustrating a functional configuration of the information processing device in a learning phase.

Next, FIG. 10 illustrates a functional configuration of the information processing device 4 in a learning phase. The functional configuration illustrated in FIG. 10 is a configuration that is implemented in the "learning phase" for creating the trained model LMD for detection obtained by training the learning model M with training data.

In the learning phase, an RW control unit 50, an acquisition unit 51, a classification unit 52, and a learning unit 53 are configured in the CPU 30. The RW control unit 50 and the acquisition unit 51 are the same functional units as the RW control unit 40 and the acquisition unit 41 in the operation phase.

In the learning phase, the RW control unit 50 writes a sample image SP to the storage device 31. The sample image SP is a data set including a plurality of cell sample images SP1 and a plurality of non-cell sample images SP2 and is used as training data for training the learning model M. The cell sample image SP1 is given a label indicating a cell. The non-cell sample image SP2 is given a label indicating a non-cell.

The acquisition unit 51 acquires the sample image SP from the storage device 31 through the RW control unit 50 and identifies the cell sample image SP1 and the non-cell sample image SP2 on the basis of the labels. In addition, the acquisition unit 51 inputs the non-cell sample image SP2 out of the cell sample image SP1 and the non-cell sample image SP2 included in the acquired sample image SP to the classification unit 52. In addition, the acquisition unit 51 inputs the cell sample image SP1 out of the cell sample image SP1 and the non-cell sample image SP2 to the learning unit 53.

The classification unit 52 classifies a non-cell sample image, which is similar to the cell sample image SP1, among the non-cell sample images SP2 input from the acquisition unit 51 as a cell-like sample image SP2A and classifies a non-cell sample image, which is not similar to the cell sample image SP1, as a cell-unlike sample image SP2B, on the basis of sub-labels which will be described below. The classification unit 52 inputs the classified cell-like sample image SP2A and cell-unlike sample image SP2B to the learning unit 53 together with the classification results.

In addition, the acquisition unit 51 may input all of the sample images SP to the classification unit 52, and the classification unit 52 may classify the sample images SP into the cell sample image SP1, the cell-like sample image SP2A, and the cell-unlike sample image SP2B. In this case, the cell sample image SP1, the cell-like sample image SP2A, and the cell-unlike sample image SP2B are input from the classification unit 52 to the learning unit 53.

The learning model M is stored in the storage device 31. The learning unit 53 trains the learning model M to detect the cell sample image SP1 and the cell-like sample image SP2A as the cell candidate regions PR, thereby creating the trained model LMD for detection, which will be described in detail below.

Figure 11:
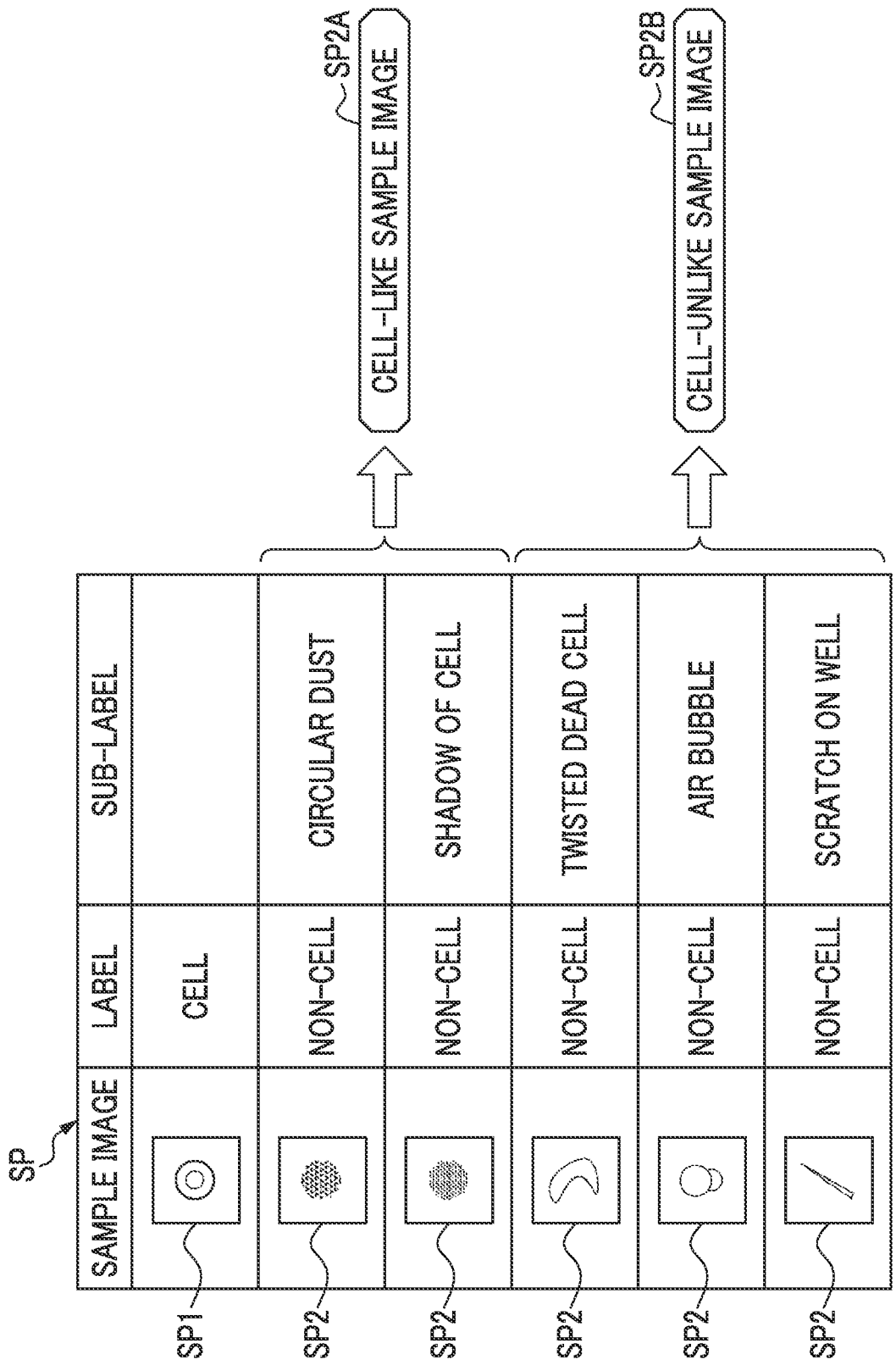
FIG. 11 is a diagram illustrating an example of a classification process.

FIG. 11 illustrates an example of a classification process by the classification unit 52. As illustrated in FIG. 11, for example, the sample image SP is given a label indicating whether or not the sample image SP is a cell. Further, the label of the non-cell sample image SP2 is subdivided, and the non-cell sample image SP2 is given a sub-label in addition to a label indicating whether or not the non-cell sample image SP2 is a cell. The sub-label indicates the features of a structure in the non-cell sample image SP2. For example, the non-cell sample image SP2 is given a sub-label indicating "circular dust", a "shadow of a cell" a "twisted dead cell", an "air bubble", or a "scratch on a well".

The classification unit 52 classifies a non-cell sample image having similar appearance features to a cell as the cell-like sample image SP2A on the basis of the sub-label given to the non-cell sample image SP2. For example, the classification unit 52 classifies the non-cell sample image SP2 given the sub-label indicating the "circular dust" or the "shadow of the cell" as the cell-like sample image SP2A. In addition, the classification unit 52 classifies the non-cell sample image SP2 given the sub-label indicating the "twisted dead cell", the "air bubble", or the "scratch on the well", which is clearly different from a cell, as the cell-unlike sample image SP2B.

In addition, the sub-label of the object to be classified as the cell-like sample image SP2A is set in advance. For example, various sub-labels may be arranged on the basis of visual similarity, and the sub-label of the object be classified as the cell-like sample image SP2A may be set on the basis of the sensitivity or the number of detections of a target cell.

Figure 12:
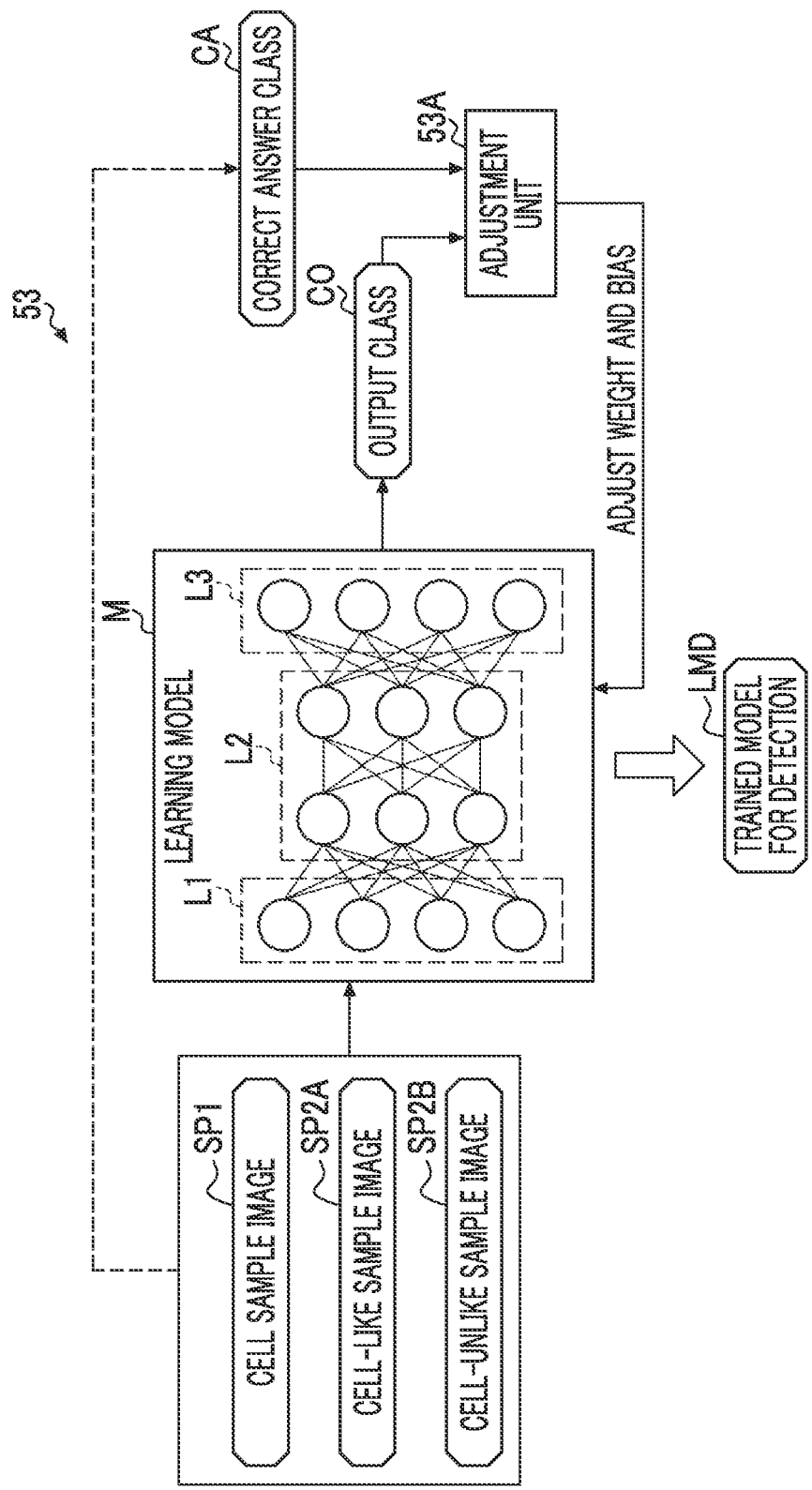
FIG. 12 is a diagram illustrating an example of a learning process.

FIG. 12 illustrates an example of a learning process by the learning unit 53. As illustrated in FIG. 12, the learning unit 53 is provided with an adjustment unit 53A that adjusts a weight and bias of the learning model M. The learning model M is a neural network including an input layer L1, an intermediate layer L2, and an output layer L3. The learning model M is configured by, for example, a convolutional neural network which is a kind of deep learning network.

The learning model M calculates a class for an input image input to the input layer L1 and outputs the class from the output layer L3. Hereinafter, the class output from the output layer L3 is referred to as an output class CO. The learning model M outputs any one of the cell class C1, the cell-like class C2A, or the cell-unlike class C2B as the output class CO.

The learning unit 53 inputs the cell sample image SP1, the cell-like sample image SP2A, and the cell-unlike sample image SP2B as input images to the learning model M. A correct answer class CA corresponding to each sample image is input to the adjustment unit 53A. In a case in which the cell sample image SP1 is input to the learning model M, the correct answer class CA is the cell class C1. In a case in which the cell-like sample image SP2A is input to the learning model M, the correct answer class CA is the cell-like class C2A. In a case in which the cell-unlike sample image SP2B is input to the learning model M, the correct answer class CA is the cell-unlike class C2B.

The adjustment unit 53A uses, for example, a loss function for calculating a sum of squared error. The adjustment unit 53A calculates the sum of squared error of the output class CO and the correct answer class CA and adjusts the weight and bias of the learning model M such that the sum of the sum of squared error is minimized.

The learning unit 53 generates the learning model M, in which the final adjusted weight and bias have been set, as the trained model LMD for detection. The trained model LMD for detection detects the object regions R classified into the cell class C1 and the cell-like class C2A as the cell candidate regions PR (see FIG. 5).

In addition, the trained model LMD for detection is not limited to the above-described configuration and may be configured to detect each of a region including the cell sample image SP1 and a region including the cell-like sample image SP2A as the cell candidate region PR from the vessel image WP.

Further, the trained model LMD for detection is not limited to deep learning and may have a classifier that is constructed using a support vector machine after the feature amount of the structure included in the sample image SP is quantified. In this case, for example, an outer peripheral length or a circularity of the structure is used as the feature amount. In addition, local contrast, brightness, saturation, or a differential value thereof can be used as the feature amount. Further, various frequency spectrum components can be used as the feature amount.

Furthermore, the trained model LMD for detection is not limited to the support vector machine and may have a classifier that is constructed by machine learning such as random forest or logistic regression.

Hereinafter, various modification examples of the classification process by the classification unit 52 will be described.

First Modification Example

In the above-described embodiment, the classification unit 52 classifies the non-cell sample images SP2 into the cell-like sample image SP2A and the cell-unlike sample image SP2B on the basis of the sub-labels given to the non-cell sample images SP2. However, in this modification example, the classification unit 52 classifies the non-cell sample images SP2 into the cell-like sample image SP2A and the cell-unlike sample image SP2B on the basis of the feature amounts.

Figure 13:
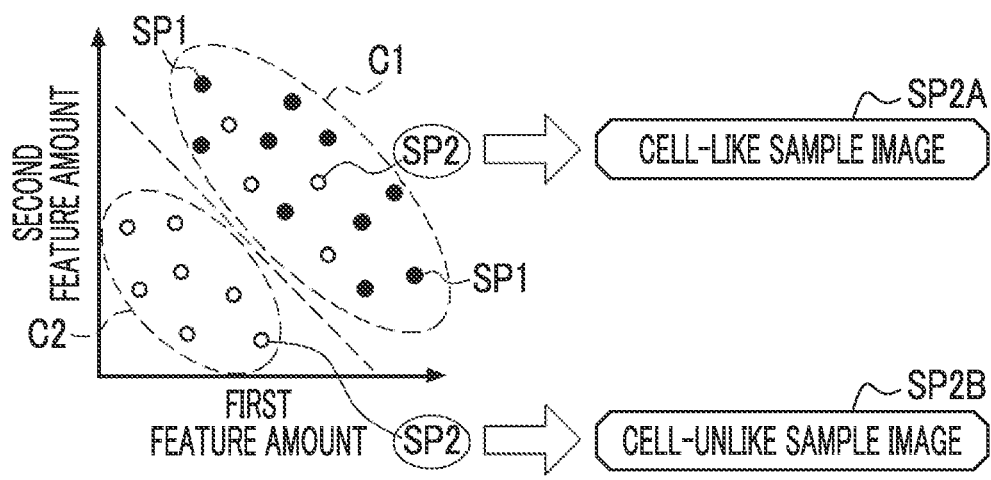
FIG. 13 is a diagram illustrating a classification process according to a first modification example.

FIG. 13 illustrates a classification process according to a first modification example. In this modification example, the classification unit 52 maps the cell sample image SP1 and the non-cell sample image SP2 to a feature amount space on the basis of a common feature amount, using clustering, principal component analysis (PCA), or a method similar thereto.

Then, the classification unit 52 classifies a non-cell sample image SP2 similar to the cell sample image SP1 among the non-cell sample images SP2 as the cell-like sample image SP2A in the feature amount space. Specifically, the classification unit 52 defines a region including all or most of the cell sample images SP1 as the cell class C1 in the feature amount space and classifies the non-cell sample image SP2 included in the cell class as the cell-like sample image SP2A. In addition, the classification unit 52 defines a region including most of the non-cell sample images SP2 as the non-cell class C2 in the feature amount space and classifies the non-cell sample image SP2 included in the non-cell class C2 as the cell-unlike sample image SP2B.

Further, the classification unit 52 may quantify the distance between the sample images in the feature amount space as a "degree of similarity" and classify the non-cell sample image SP2 having a high degree of similarity to the cell sample image SP1 as the cell-like sample image SP2A on the basis of the degree of similarity.

In addition, for example, the outer peripheral length or the circularity of the structure is used as the feature amount. A more simplified or complicated feature amount may be used for the classification of the cell-like sample image SP2A. Further, in FIG. 13, the feature amount space represented by two feature amounts of a first feature amount and a second feature amount is used. However, a feature amount space represented by three or more feature amounts may be used.

Second Modification Example

In a second modification example, the classification unit 52 classifies the non-cell sample images into the cell-like sample image SP2A and the cell-unlike sample image SP2B, using a trained model LMC for classification that classifies only the cell sample image SP1 out of the cell sample image SP1 and the non-cell sample image SP2 as the cell candidate region PR.

A configuration of the classification unit 52 according to the second modification example will be described. The trained model LMC for classification is different from the trained model LMD for detection and is trained to classify the cell sample image SP1 and the non-cell sample image SP2 into the cell class C1 and the non-cell class C2, respectively. That is, the trained model LMC for classification is configured to classify only the cell sample image SP1 classified into the cell class C1 as the cell candidate region PR. The trained model LMC for classification is configured by, for example, a convolutional neural network, similarly to the trained model LMD for detection.

Figure 14:
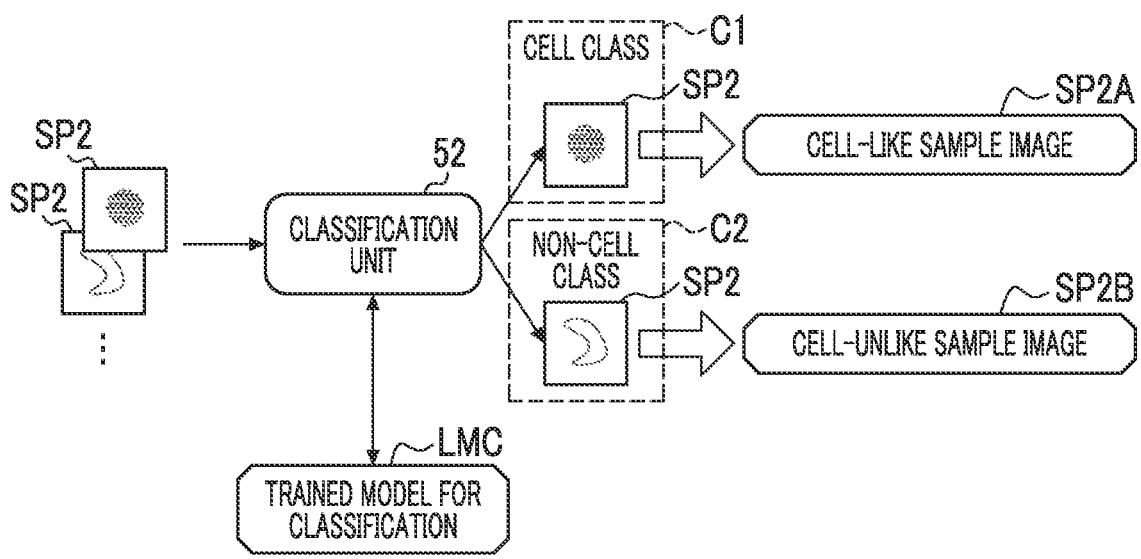
FIG. 14 is a diagram illustrating a classification process according to a second modification example.

FIG. 14 illustrates a classification process according to the second modification example. In this modification example, the classification unit 52 inputs various non-cell sample images SP2 as input images to the trained model LMC for classification. The trained model LMC for classification basically classifies the non-cell sample images SP2 into the non-cell class C2. It can be considered that the non-cell sample image SP2 misclassified into the cell class C1 by the trained model LMC for classification has a high degree of similarity to the cell sample image SP1. As described above, in a case in which the trained model LMC for classification classifies the non-cell sample image SP2 having a high degree of similarity to the cell sample image SP1 into the cell class C1, the cell sample image SP1 similar to the non-cell sample image SP2 among the cell sample images SP1 which are originally cells is likely to be misclassified into the non-cell class C2. This corresponds to that, in a state in which the classification unit 52 classifies the non-cell sample image SP2 belonging to the cell class C1 as a non-cell, the cell sample image SP1 similar to the non-cell sample image SP2 belonging to the cell class C1 among the cell sample images SP1 is misclassified as a non-cell, in other words, that the cell sample image SP1, which is similar to the non-cell sample image SP2 belonging to the cell class C1, but is originally a cell, is misclassified as a non-cell, that is, that the sensitivity is reduced.

The classification unit 52 classifies the non-cell sample image SP2 classified into the cell class C1 (misclassified as the cell candidate region PR) among the non-cell sample images SP2 input to the trained model LMC for classification as the cell-like sample image SP2A. In addition, the classification unit 52 classifies the non-cell sample image SP2 classified into the non-cell class C2 among the non-cell sample images SP2 input to the trained model LMC for classification as the cell-unlike sample image SP2B. As described above, the classification unit 52 learns all of the image samples classified into the cell class C1 as the cell sample images SP1 and the cell-like sample images SP2A.

Assuming that the classification unit 52 classifies a large number of non-cell sample images SP2 as the cell-like sample images SP2A, the sensitivity is improved, but the accuracy of detecting cells is reduced. In this modification example, the classification unit 52 classifies only the non-cell sample image SP2 misclassified into the cell class C1 as the cell-like sample image SP2A, thereby achieving both sensitivity and accuracy.

Third Modification Example

In a third modification example, the trained model LMC for classification (see FIG. 14) according to the second modification example has the same configuration as the trained model LMD for detection (see FIG. 5). In this modification example, the learning model M is trained using the cell-like sample image SP2A and the cell-unlike sample image SP2B classified by the classification unit 52, and a replacement process of replacing the trained model LMC for classification with the learning model M which is being trained is performed.

A configuration of the classification unit 52 according to the third modification example will be described. In this modification example, the trained model LMC for classification classifies the sample images into three classes of the cell class C1, the cell-like class C2A, and the cell-unlike class C2B, similarly to the trained model LMD for detection. The trained model LMC for classification is configured to classify the cell sample image SP1 and the non-cell sample image SP2 into the cell class C1 and the cell-unlike class C2B, respectively, in terms of the initial design. That is, the trained model LMC for classification is configured to classify only the cell sample image SP1 classified into the cell class C1 as the cell candidate region PR.

Figure 15:
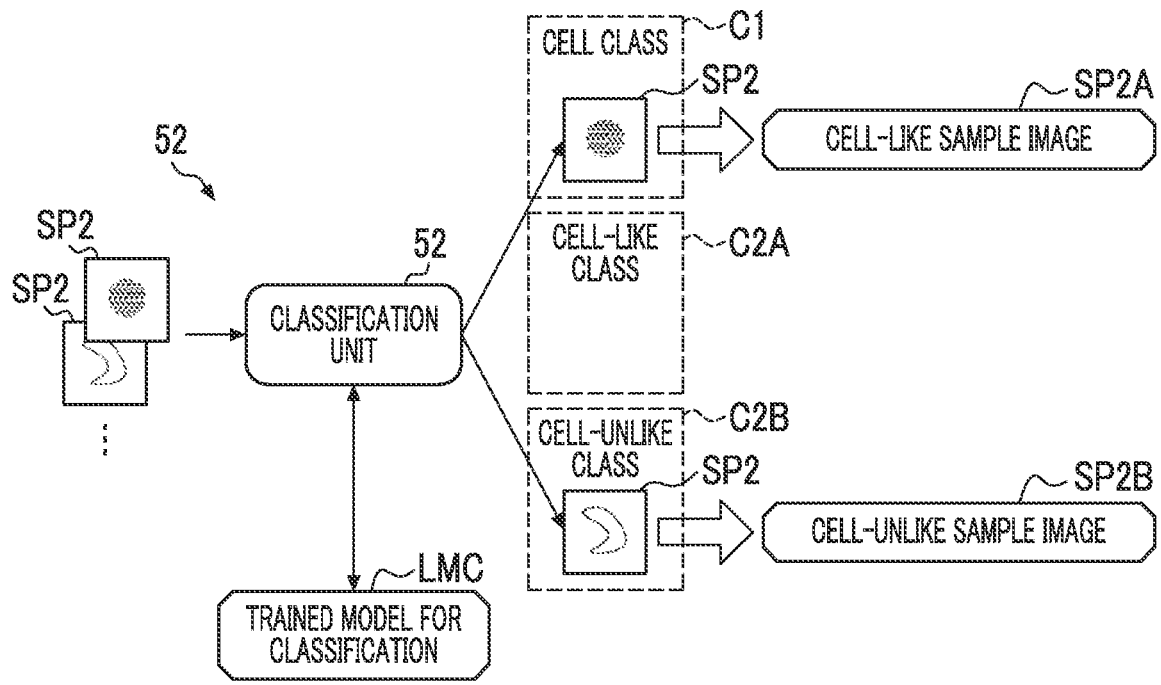
FIG. 15 is a diagram illustrating a classification process according to a third modification example.

FIG. 15 illustrates a classification process according to the third modification example. In this modification example, the trained model LMC for classification basically classifies the non-cell sample image SP2 into the cell-like class C2A or the cell-unlike class C2B. It can be considered that the non-cell sample image SP2 misclassified into the cell class C1 by the trained model LMC for classification has a high degree of similarity to the cell sample image SP1. As described above, in a case in which the trained model LMC for classification classifies the non-cell sample image SP2 having a high degree of similarity to the cell sample image SP1 into the cell class C1, the trained model LMC for classification is likely to misclassify the cell sample image SP1 similar to the non-cell sample image SP2 among the cell sample images SP1, which are originally cells, into the non-cell class C2. This corresponds to that, in a state in which the classification unit 52 learns the non-cell sample image SP2 belonging to the cell class C1 as a non-cell, the cell sample image SP1 similar to the non-cell sample image SP2 belonging to the cell class C1 among the cell sample images SP1 is misclassified as a non-cell, in other words, that the cell sample image SP1 which is similar to the non-cell sample image SP2 belonging to the cell class C1, but is originally a cell, is misclassified as a non-cell, that is, that sensitivity is reduced.

The classification unit 52 classifies the non-cell sample image SP2 (misclassified as the cell candidate region PR) misclassified into the cell class C1 among the non-cell sample images SP2 input to the trained model LMC for classification as the cell-like sample image SP2A. In addition, the classification unit 52 classifies the non-cell sample image SP2 classified into the cell-unlike class C2B among the non-cell sample images SP2 input to the trained model LMC for classification as the cell-unlike sample image SP2B. As described above, the classification unit 52 learns all of the image samples classified into the cell class C1 as the cell sample images SP1 and the cell-like sample images SP2A.

Assuming that the classification unit 52 classifies a large number of non-cell sample images SP2 as the cell-like sample images SP2A, the sensitivity is improved, but the accuracy of detecting cells is reduced. In this modification example, the classification unit 52 classifies only the non-cell sample image SP2 misclassified into the cell class C1 as the cell-like sample image SP2A, thereby achieving both sensitivity and accuracy.

Figure 16:
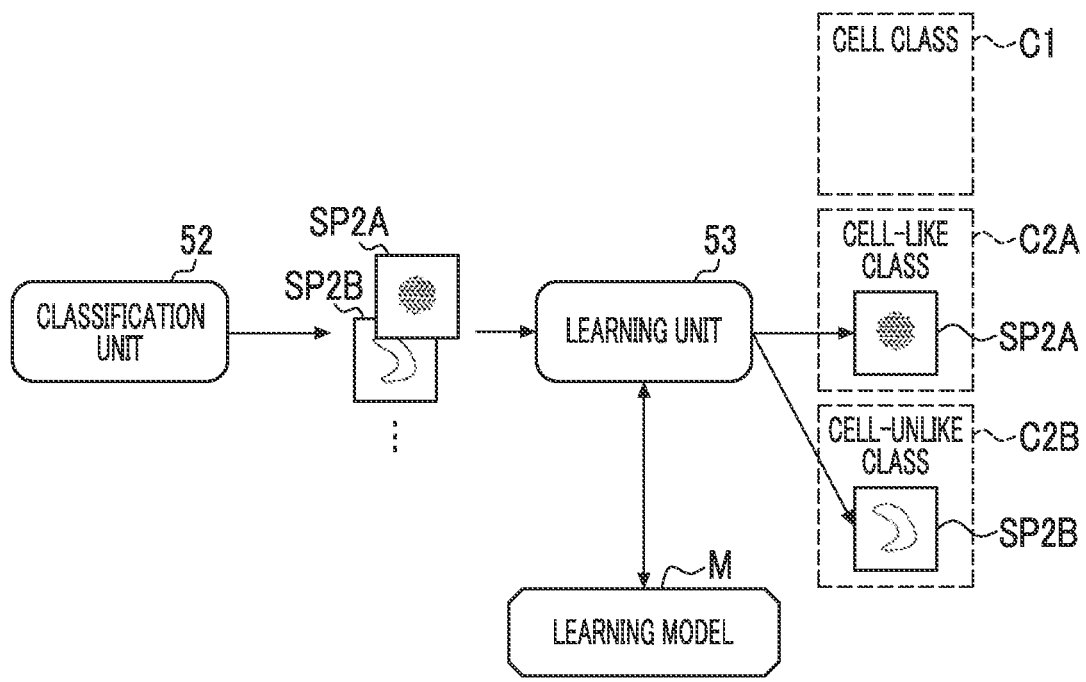
FIG. 16 is a diagram illustrating a learning process according to the third modification example.

FIG. 16 illustrates a learning process according to the third modification example. In this modification example, the learning unit 53 trains the learning model M using the cell-like sample image SP2A and the cell-unlike sample image SP2B classified by the classification unit 52. Specifically, the learning unit 53 trains the learning model M to classify the cell-like sample image SP2A and the cell-unlike sample image SP2B classified by the classification unit 52 into the cell-like class C2A and the cell-unlike class C2B, respectively. In addition, the learning unit 53 may further train the learning model M using the cell sample image SP1.

For example, the learning unit 53 performs the learning process whenever a predetermined number of non-cell sample images SP2 are input to the trained model LMC for classification and the classification process is performed.

Figure 17:
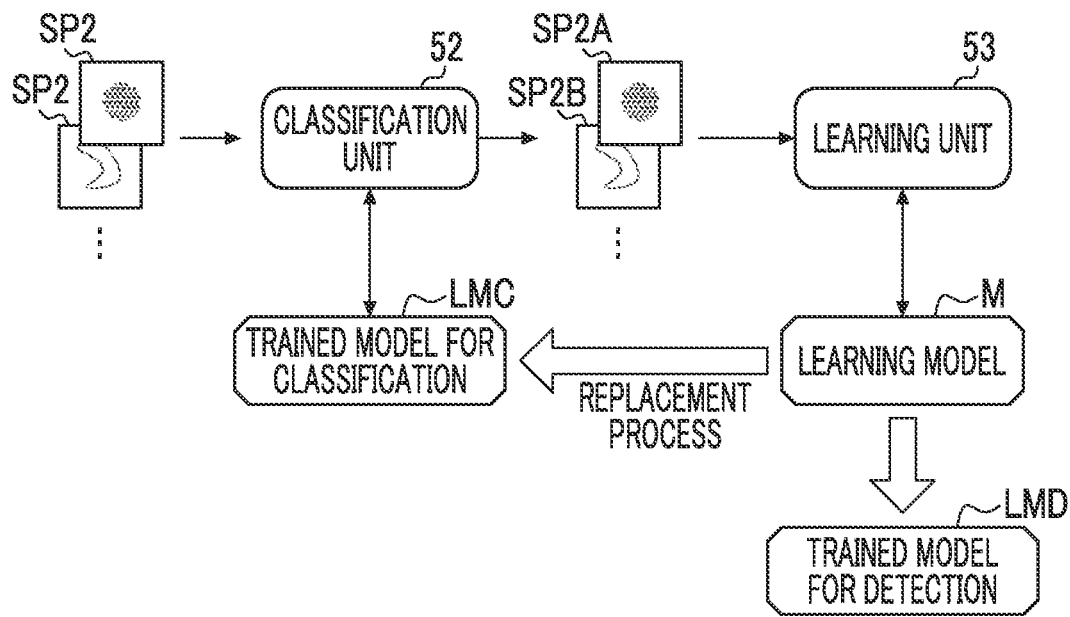
FIG. 17 is a diagram illustrating a replacement process according to the third modification example.

FIG. 17 illustrates the learning process according to the third modification example. The learning unit 53 trains the learning model M as described above and then performs a replacement process of replacing the trained model LMC for classification with the learning model M. For example, the learning unit 53 performs the replacement process whenever the learning model M is trained with a predetermined number of cell-like sample images SP2A and cell-unlike sample images SP2B. After the replacement process is performed, the classification unit 52 performs the classification process again using the trained model LMC for classification.

Figure 18:
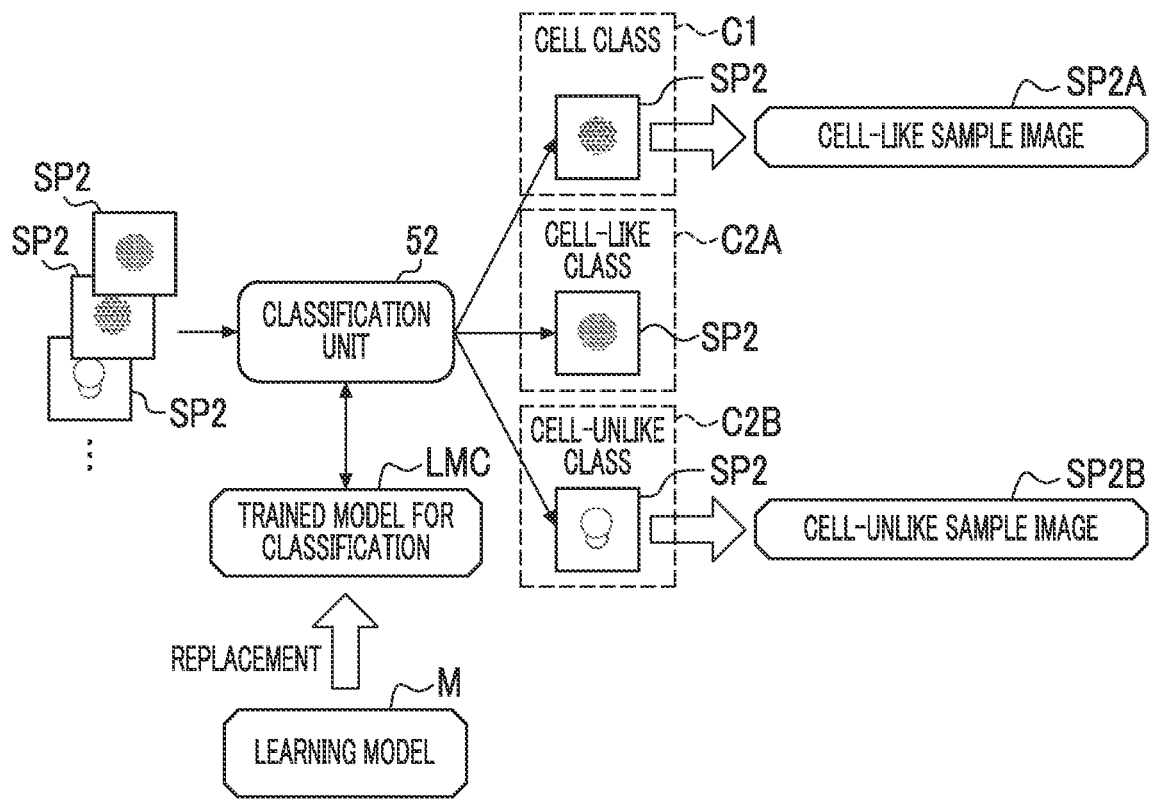
FIG. 18 is a diagram illustrating an example of a classification process performed after the replacement process.

FIG. 18 illustrates an example of the classification process performed after the replacement process. In a case in which the non-cell sample image SP2 (for example, the non-cell sample image SP2 having the sub-label indicating the "shadow of a cell") classified into the cell class C1 in the previous classification process is input, the classification unit 52 classifies the non-cell sample image SP2 into the cell-like class C2A. In addition, in a case in which the non-cell sample image SP2 (for example, the non-cell sample image SP2 having the sub-label indicating the "circular dust") similar to the cell sample image SP1 is newly input, the classification unit 52 classifies the non-cell sample image SP2 into the cell class C1.

As described above, in a case in which the replacement process is performed and the non-cell sample image SP2 similar to the cell sample image SP1 is newly input, the classification unit 52 classifies the non-cell sample image SP2 as the cell-like sample image SP2A and supplies the cell-like sample image SP2A to the learning unit 53. Therefore, a repetition process of repeatedly performing the classification process, the learning process, and the replacement process is performed to gradually improve the sensitivity of the learning model M. The learning unit 53 uses the learning model M at a time when the repetition process ends as the trained model LMD for detection.

Further, in the operation phase, the trained model LMD for detection detects the cell region R1 classified into the cell class C1 and the cell-like region R2A classified into the cell-unlike class C2B as the cell candidate regions PR as in the above-described embodiment (see FIG. 5).

Figure 19:
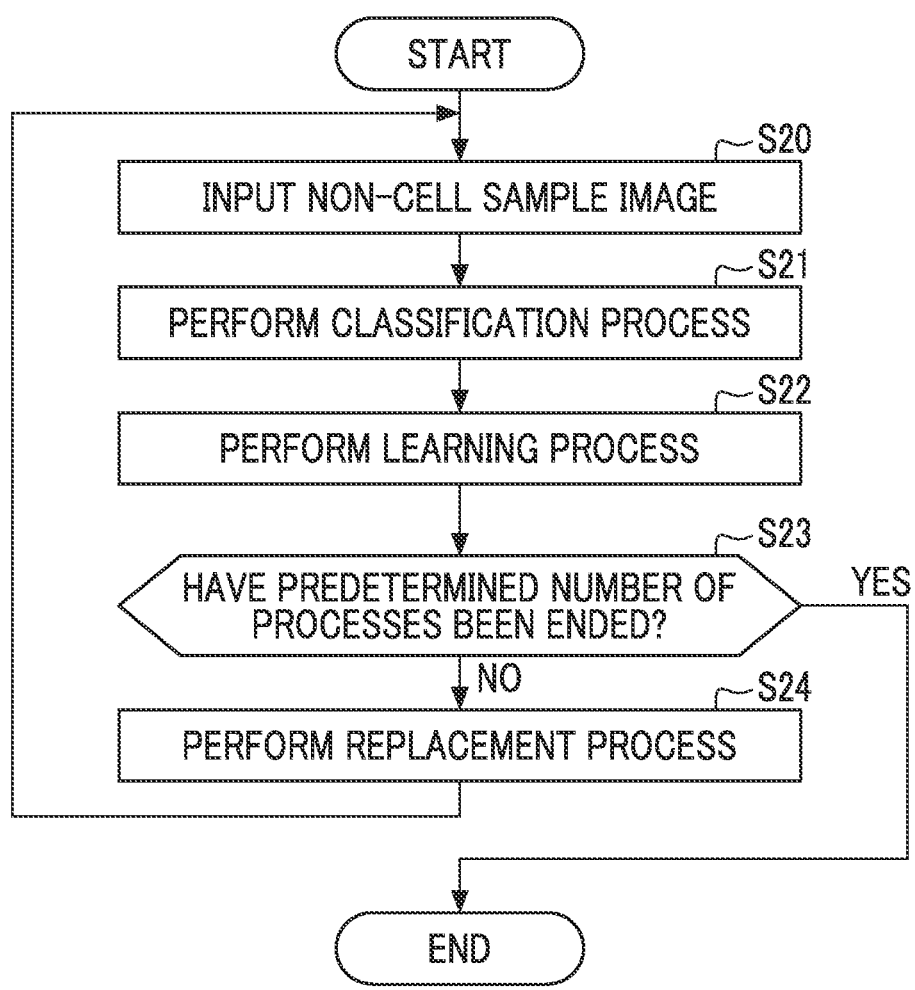
FIG. 19 is a flowchart illustrating an example of a repetition process.

FIG. 19 is a flowchart illustrating an example of the repetition process. First, among a plurality of non-cell sample images SP2, a predetermined number of non-cell sample images SP2 are input to the classification unit 52 (Step S20). The classification unit 52 performs the classification process using the trained model LMC for classification to classify the non-cell sample images SP2 into the cell-like sample image SP2A and the cell-unlike sample image SP2B as illustrated in FIG. 15 (Step S21). As illustrated in FIG. 16, the learning process of the learning unit 53 training the learning model M is performed on the basis of the classification results by the classification unit 52 (Step S22).

Then, it is determined whether or not a predetermined number of classification processes and learning processes have been ended (Step S23). In a case in which the predetermined number of classification processes and learning processes have not been ended (Step S23: NO), the replacement process of replacing the trained model LMC for classification with the learning model M trained by the learning process is performed as illustrated in FIG. 17 (Step S24). Then, the process returns to Step S20. On the other hand, in a case in which the predetermined number of classification processes and learning processes have been ended (Step S23: YES), the process ends. The learning model M at a time when the process ends is the trained model LMD for detection which is used in the operation phase.

In addition, in the flowchart illustrated in FIG. 19, the end condition of the repetition process is that the predetermined number of classification processes and learning processes have been ended. Instead of this, the end condition of the repetition process may be that, in the classification process, there is no non-cell sample image SP2 classified into the cell class C1, that is, there is no non-cell sample image SP2 misclassified as the cell candidate region PR. For example, in a case in which the non-cell sample image SP2 is continuously classified into the cell-like class C2A or the cell-unlike class C2B a predetermined number of times in the classification process, the repetition process is ended.

OTHER MODIFICATION EXAMPLES

Figure 20:
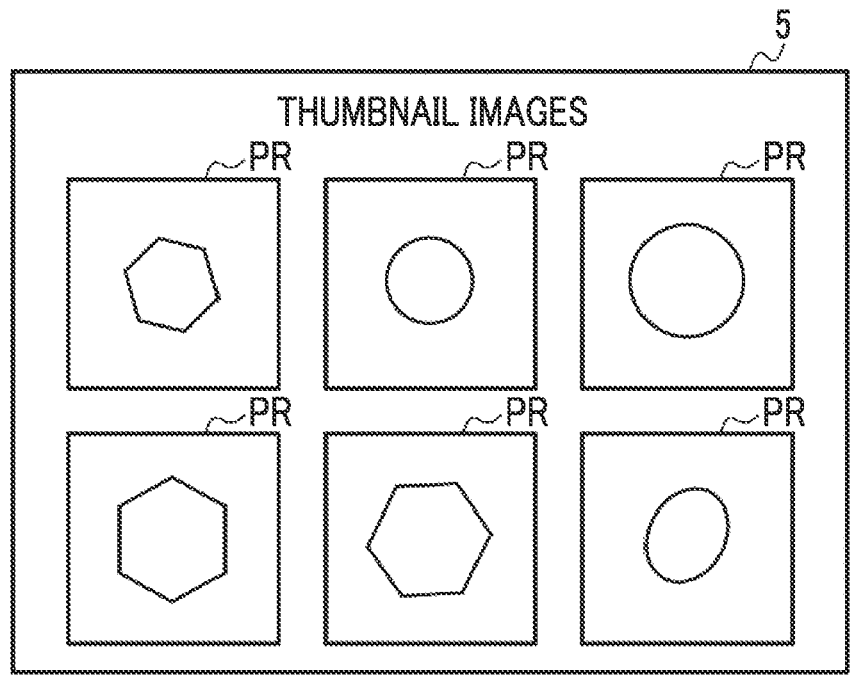
FIG. 20 is a diagram illustrating a modification example of a display aspect of the cell candidate region.

Next, a modification example of the display aspect of the cell candidate region PR will be described. In the above-described embodiment, as illustrated in FIG. 6, the display control unit 43 enlarges and displays the cell candidate region PR. As illustrated in FIG. 20, in this modification example, the display control unit 43 displays a list of thumbnail images of a plurality of cell candidate regions PR detected from the vessel image WP. This enables the user to check the plurality of cell candidate regions PR at a glance.

Figure 21:
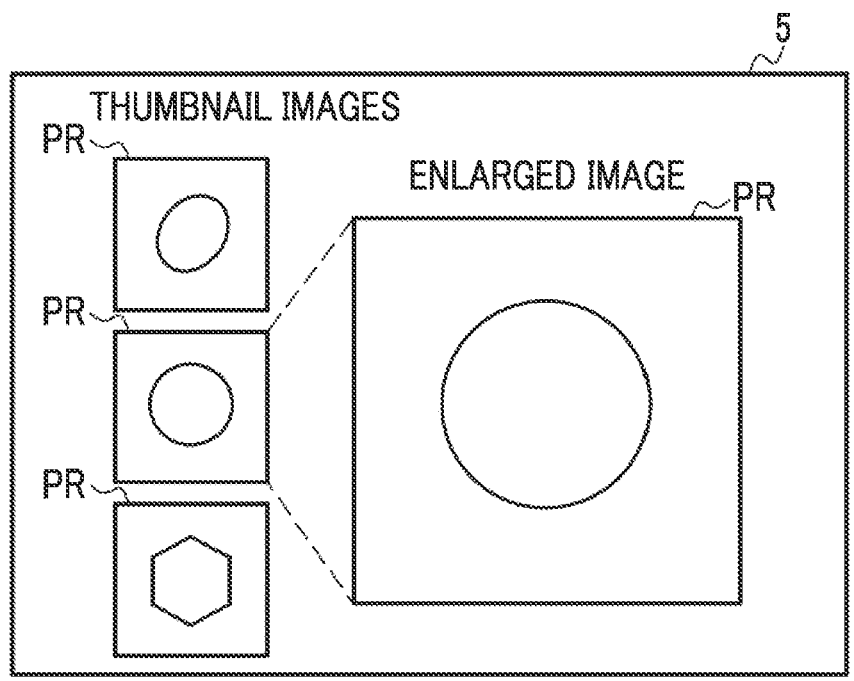
FIG. 21 is a diagram illustrating another modification example of the display aspect of the cell candidate region.

FIG. 21 illustrates another modification example of the display aspect of the cell candidate regions PR. As illustrated in FIG. 21, in this modification example, the display control unit 43 displays the thumbnail images of a plurality of cell candidate regions PR detected from the vessel image WP. In addition, the display control unit 43 further enlarges and displays some of the thumbnail images. It is preferable that the thumbnail images to be further enlarged and displayed can be selected by the user using the input operation unit 8. This enables the user to more accurately determine whether or not the cell candidate region is a cell.

Figure 22:
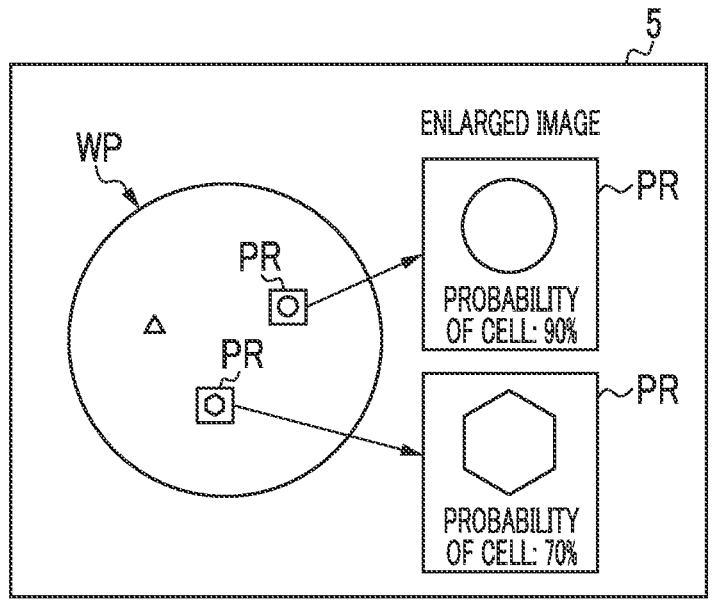
FIG. 22 is a diagram illustrating an example in which the probability of the cell candidate region being a cell is displayed in a cell candidate region.

In addition, the display control unit 43 may display the probability of the cell candidate region PR being a cell. For the probability of the cell candidate region being a cell, a discriminator may be provided in the trained model LMD for detection. After the cell candidate region PR is detected, the discriminator may calculate the probability that a structure in the detected cell candidate region PR will be a cell. For example, as illustrated in FIG. 22, the display control unit 43 displays the probability of the cell candidate region being a cell as a percentage on the enlarged image of each of the cell candidate regions PR. The user can determine whether or not the cell candidate region is a cell with reference to the probability displayed for the cell candidate region PR.

In addition, a binarization process of binarizing the probability which has not been binarized may be performed to display only information indicating whether or not the cell is a single cell. In addition, the probability is not limited to a numerical value and may be expressed by, for example, a color or density.

In the above-described embodiment, the trained model LMD for detection classifies the object regions R into three classes of the cell class C1, the cell-like class C2A, and the cell-unlike class C2B. Instead of this, the trained model LMD for detection is configured to classify the object region R into two classes of a class obtained by integrating the cell class C1 and the cell-like class C2A and the cell-unlike class C2B. In this case, the display control unit 43 can display the probability as a binary value by associating the result of the classification into the two classes by the trained model LMD for detection with the probability, without performing the binarization process.

EXAMPLES

Next, an example in which the unity of cells is determined by the method according to the present disclosure will be described. In this example, immediately after CHO cells were seeded in 140 wells 11, the imaging device 3 imaged each well 11 to obtain 140 vessel images WP. Then, for all of the vessel images WP, a person visually classified all of the structures in the vessel images WP into the cell class C1, the cell-like class C2A, and the cell-unlike class C2B to create the correct answer class CA of each structure.

Then, in the learning phase, the trained model LMD for detection was created by training the learning model M using 70 vessel images WP among the 140 vessel images WP as training data. Then, in the operation phase, the remaining 70 vessel images WP were input as test images to the trained model LMD for detection, and the detection results of the cell candidate regions PR by the trained model LMD for detection were checked.

In addition, from the 70 vessel images WP as the test images, 230 structures were identified by the visual determination of the person. It was confirmed that, among the 230 structures, 90 structures were true cells (that is, the structures were classified into the cell class C1).

In addition, the above-mentioned test images were input to a trained model created to detect only cells according to the method of the related art, that is, a trained model for classifying cells and non-cells, and the detection results of the cell candidate regions PR were checked.

Figure 23:
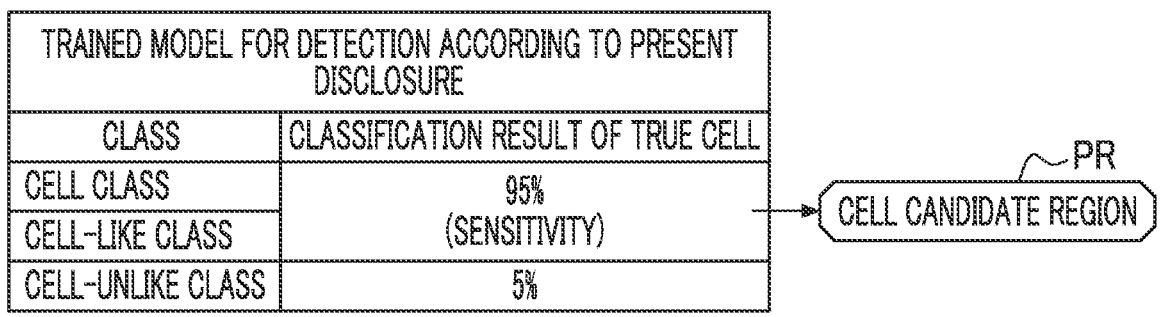
FIG. 23 is a diagram illustrating classification results of true cells by a trained model for detection according to the present disclosure.

FIG. 23 illustrates the classification results of true cells by the trained model LMD for detection according to the present disclosure. As illustrated in FIG. 23, the trained model LMD for detection according to the present disclosure classified 95% of the true cells into the cell class C1 or the cell-like class C2A. As a result, 95% of the true cells were detected as the cell candidate regions PR. That is, the sensitivity of the trained model LMD for detection according to the present disclosure was 95%.

Figure 24:
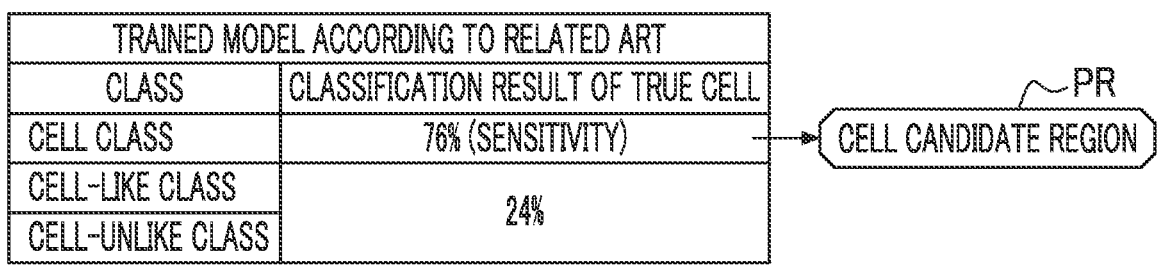
FIG. 24 is a diagram illustrating classification results of true cells by a trained model according to the related art.

FIG. 24 illustrates the classification results of true cells by the trained model according to the related art. As illustrated in FIG. 24, the trained model according to the related art classified 76% of the true cells into the cell class C1. As a result, 76% of the true cells were detected as the cell candidate regions PR. That is, the sensitivity of the trained model according to the related art was 76%.

As described above, while the sensitivity was 76% in the technique according to the related art, the sensitivity was improved to 95% in the technique of the present disclosure. That is, according to the technique of the present disclosure, it was confirmed that the accuracy of guaranteeing the unity of cells was improved.

In addition, 3022 non-cell sample images SP2 classified into the cell-like class C2A were input to the trained model LMD for detection according to the present disclosure. As a result, 1335 non-cell sample images SP2 were reclassified into the cell-like class C2A, and 1687 non-cell sample images SP2 were reclassified into the cell-unlike class C2A. This suggests that the over-detection of detecting non-cells as cells is likely to be reduced by about 55%. That is, this suggests that both sensitivity and accuracy are achieved.

In addition, it is also preferable to set a target value to the sensitivity and to perform training using sample images in multiple stages to gradually improve the performance of the trained model LMD for detection toward the target value.

As described above, according to the technique of the present disclosure, it is possible to suppress excessive detection as necessary while assuming high sensitivity. That is, according to the technique of the present disclosure, in a case in which cells having features similar to those of a known non-cell sample appear in an unknown sample, it is possible to maintain the sensitivity thereof.

The hardware configuration of the computer constituting the information processing device 4 can be modified in various ways. For example, the information processing device 4 may be configured by a plurality of computers separated as hardware in order to improve processing capacity and reliability.

In the above-described embodiment, for example, the following various processors can be used as a hardware structure of processing units performing various processes, such as the RW control unit 40, the acquisition unit 41, the detection unit 42, the display control unit 43, the receiving unit 44, the giving unit 45, the aggregation unit 46, the RW control unit 50, the acquisition unit 51, the classification unit 52, and the learning unit 53. The various processors include, for example, the CPU 30 which is a general-purpose processor executing software (program 31A) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and/or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system on chip (SoC). As described above, various processing units are configured by one or more of the various processors as a hardware structure.

In addition, specifically, an electric circuit (circuitry) obtained by combining circuit elements, such as semiconductor elements, can be used as the hardware structure of the various processors.

All of the publications, the patent applications, and the technical standards described in the specification are incorporated by reference herein to the same extent as each individual document, each patent application, and each technical standard are specifically and individually stated to be incorporated by reference.

What is claimed is:

1. An information processing device that detects a cell candidate region for determining a unity of a cell from a vessel image obtained by imaging a vessel in which the cell is seeded, the information processing device comprising:
    at least one processor,
    wherein the processor:
    performs an acquisition process of acquiring the vessel image;
    performs a detection process of detecting, from the vessel image acquired by the acquisition process, a cell region including the cell and a cell-like region including an object similar to the cell as cell candidate regions, using a trained model for detection which has been created by training a learning model using training data, the training data being a data set including a plurality of cell sample images given a label indicating the cell and a plurality of non-cell sample images given a label indicating a non-cell; and
    performs an output process of outputting information indicating the detected cell candidate regions;
    wherein the processor further:
    performs a classification process of classifying, among the non-cell sample images, a non-cell sample image misclassified as the cell candidate region as a cell-like sample image, using a trained model for classification that classifies only the cell sample images out of the cell sample images and the non-cell sample images as the cell candidate regions; and
    performs a learning process of creating the trained model for detection that detects the cell sample images and the cell-like sample images as the cell candidate regions.

2. The information processing device according to claim 1,
    wherein, after performing the classification process, the processor performs the learning process for creating the trained model for detection, and performs a replacement process of replacing the learning model, which is being trained, with the trained model for classification.

3. The information processing device according to claim 2,
    wherein the processor repeats the classification process, the learning process, and the replacement process on a plurality of the non-cell sample images a predetermined number of times or until there is no non-cell sample image misclassified as the cell candidate region.

4. The information processing device according to claim 1,
    wherein the processor trains the learning model using deep learning in the learning process.

5. The information processing device according to claim 1,
    wherein the processor performs a display process of displaying the cell candidate region on a display separately from the vessel image in the output process.

6. The information processing device according to claim 5,
    wherein the processor displays a probability that the cell candidate region displayed on the display will be the cell in the display process.

7. The information processing device according to claim 5,
    wherein the processor performs a receiving process of receiving an operation of a user giving a determination result of whether or not the cell candidate region displayed on the display is the cell.

8. The information processing device according to claim 7,
    wherein the processor performs a giving process of giving the determination result received by the receiving process to the cell candidate region.

9. The information processing device according to claim 8,
    wherein, in a case in which there are a plurality of the vessel images acquired by the acquisition process, the processor aggregates the detection result of the cell candidate region by the detection process or the determination result given by the giving process for each of the vessel images and outputs an aggregation result.

10. The information processing device according to claim 9,
    wherein the aggregation result includes the unity of the cell or the number of cells for each vessel image.

11. An information processing method that performs a process of detecting a cell candidate region for determining a unity of a cell from a vessel image obtained by imaging a vessel in which the cell is seeded, the information processing method comprising:
    an acquisition process of acquiring the vessel image;
    a detection process of detecting, from the vessel image acquired by the acquisition process, a cell region including the cell and a cell-like region including an object similar to the cell as cell candidate regions, using a trained model for detection which has been created by training a learning model using training data, the training data being a data set including a plurality of cell sample images given a label indicating the cell and a plurality of non-cell sample images given a label indicating a non-cell; and
    an output process of outputting information indicating the detected cell candidate regions;
    wherein the information processing method further comprises:
    a classification process of classifying, among the non-cell sample images, a non-cell sample image misclassified as the cell candidate region as a cell-like sample image, using a trained model for classification that classifies only the cell sample images out of the cell sample images and the non-cell sample images as the cell candidate regions; and a learning process of creating the trained model for detection that detects the cell sample images and the cell-like sample images as the cell candidate regions.

12. A non-transitory computer-readable storage medium storing a program that causes a computer to execute a process of detecting a cell candidate region for determining a unity of a cell from a vessel image obtained by imaging a vessel in which the cell is seeded, the program causing the computer to execute:

an acquisition process of acquiring the vessel image;

a detection process of detecting, from the vessel image acquired by the acquisition process, a cell region including the cell and a cell-like region including an object similar to the cell as the cell candidate regions, using a trained model for detection which has been created by training a learning model using training data, the training data being a data set including a plurality of cell sample images given a label indicating the cell and a plurality of non-cell sample images given a label indicating a non-cell; and an output process of outputting information indicating the detected cell candidate regions;

wherein the program further causes the computer to execute:

a classification process of classifying, among the non-cell sample images, a non-cell sample image misclassified as the cell candidate region as a cell-like sample image, using a trained model for classification that classifies only the cell sample images out of the cell sample images and the non-cell sample images as the cell candidate regions; and a learning process of creating the trained model for detection that detects the cell sample images and the cell-like sample images as the cell candidate regions.

* * * * *